US012486403B2

(12) United States Patent
Riederer et al.

(10) Patent No.: US 12,486,403 B2
(45) Date of Patent: *Dec. 2, 2025

(54) POLYMERIZABLE ABSORBERS OF UV AND HIGH ENERGY VISIBLE LIGHT

(71) Applicant: Johnson & Johnson Vision Care, Inc., Jacksonville, FL (US)

(72) Inventors: Donald E. Riederer, Jacksonville, FL (US); Patricia Martin, Jacksonville, FL (US); Shivkumar Mahadevan, Jacksonville, FL (US); Dawn D. Wright, St. Augustine, FL (US); John R. Buch, Jacksonville, FL (US); Jessica Cannon, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 693 days.

This patent is subject to a terminal disclaimer.

(21) Appl. No.: 17/809,619

(22) Filed: Jun. 29, 2022

(65) Prior Publication Data

US 2022/0340759 A1 Oct. 27, 2022

Related U.S. Application Data

(63) Continuation-in-part of application No. 17/110,443, filed on Dec. 3, 2020, now Pat. No. 11,820,899, and
(Continued)

(51) Int. Cl.
*C09B 62/465* (2006.01)
*A61L 27/00* (2006.01)
(Continued)

(52) U.S. Cl.
CPC ............ *C09B 62/465* (2013.01); *A61L 27/00* (2013.01); *C08F 230/08* (2013.01); *C08L 77/00* (2013.01);
(Continued)

(58) Field of Classification Search
CPC ...................................................... G02B 1/043
See application file for complete search history.

(56) References Cited

U.S. PATENT DOCUMENTS 3,196,150 A 7/1965 Martin
3,376,303 A 4/1968 Fuchs et al.
(Continued)

FOREIGN PATENT DOCUMENTS

CN 203965745 U 11/2014
CN 106349212 A 1/2017
(Continued)

OTHER PUBLICATIONS

Chakrabarti et al., "Statistics of Real-World Hyperspectral Images", CVPR 2011, pp. 193-200, Jun. 20-25, 2011.
(Continued)

*Primary Examiner* — Michael F Pepitone
(74) *Attorney, Agent, or Firm* — Raef M. Shaltout

(57) ABSTRACT

Described are polymerizable high energy light absorbing compounds. The compounds absorb various wavelengths of ultraviolet and/or high energy visible light and are suitable for incorporation in various products, such as biomedical devices and ophthalmic devices. Such devices exhibit a number of desirable properties, including favorable rates of pervaporation.

20 Claims, 14 Drawing Sheets

UV-VIS Transmission Spectrum of Silicone Hydrogel Contact Lenses 4A and 4B

Related U.S. Application Data a continuation-in-part of application No. 16/938,117, filed on Jul. 24, 2020, said application No. 17/110,443 is a continuation of application No. 16/268,897, filed on Feb. 6, 2019, now Pat. No. 10,935,695.

(60) Provisional application No. 62/893,996, filed on Aug. 30, 2019, provisional application No. 62/691,112, filed on Jun. 28, 2018, provisional application No. 62/637,505, filed on Mar. 2, 2018.

(51) Int. Cl.

| | |
|---|---|
| *C08F 230/08* | (2006.01) |
| *C08K 5/1545* | (2006.01) |
| *C08K 5/45* | (2006.01) |
| *C08L 77/00* | (2006.01) |
| *C08L 83/04* | (2006.01) |
| *G02B 1/04* | (2006.01) |

(52) U.S. Cl.
CPC .............. *C08L 83/04* (2013.01); *G02B 1/043* (2013.01); *C08K 5/1545* (2013.01); *C08K 5/45* (2013.01)

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,769,294 A | 10/1973 | Catino et al. |
| 3,808,178 A | 4/1974 | Gaylord |
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,197,266 A | 4/1980 | Clark et al. |
| 4,436,887 A | 3/1984 | Chromecek et al. |
| 4,495,313 A | 1/1985 | Larsen |
| 4,659,763 A | 4/1987 | Gallucci et al. |
| 4,659,782 A | 4/1987 | Spinelli |
| 4,659,783 A | 4/1987 | Spinelli |
| 4,716,234 A | 12/1987 | Dunks et al. |
| 4,740,533 A | 4/1988 | Su et al. |
| 4,889,664 A | 12/1989 | Kindt-Larsen et al. |
| 4,910,277 A | 3/1990 | Bambury et al. |
| 4,997,897 A | 3/1991 | Melpolder |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,067 A | 7/1994 | Seidner et al. |
| 5,371,147 A | 12/1994 | Spinelli et al. |
| 5,470,932 A | 11/1995 | Jinkerson |
| 5,480,927 A | 1/1996 | Janssen et al. |
| 5,729,322 A | 3/1998 | Collins et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,872,118 A | 2/1999 | Kelley et al. |
| 5,916,719 A | 6/1999 | Kim et al. |
| 5,944,853 A | 8/1999 | Molock et al. |
| 5,945,465 A | 8/1999 | Ozark et al. |
| 5,962,548 A | 10/1999 | Vanderlaan et al. |
| 5,965,631 A | 10/1999 | Nicolson et al. |
| 5,977,219 A | 11/1999 | Ravichandran et al. |
| 5,998,498 A | 12/1999 | Vanderlaan et al. |
| 6,020,445 A | 2/2000 | Vanderlaan et al. |
| 6,022,158 A | 2/2000 | Nakayama et al. |
| 6,087,415 A | 7/2000 | Vanderlaan et al. |
| 6,158,862 A | 12/2000 | Patel et al. |
| 6,166,218 A | 12/2000 | Ravichandran et al. |
| 6,207,244 B1 | 3/2001 | Hesch |
| 6,244,707 B1 | 6/2001 | Faubl |
| 6,367,929 B1 | 4/2002 | Maiden et al. |
| 6,373,615 B1 | 4/2002 | Mann et al. |
| 6,420,453 B1 | 7/2002 | Bowers et al. |
| 6,423,761 B1 | 7/2002 | Bowers et al. |
| 6,767,979 B1 | 7/2004 | Muir et al. |
| 6,807,745 B2 | 10/2004 | Orton |
| 6,822,016 B2 | 11/2004 | McCabe et al. |
| 6,867,245 B2 | 3/2005 | Iwata et al. |
| 6,918,931 B2 | 7/2005 | Lai et al. |
| 6,943,203 B2 | 9/2005 | Vanderlaan et al. |
| 6,951,894 B1 | 10/2005 | Nicolson et al. |
| 7,033,391 B2 | 4/2006 | Lai et al. |
| 7,052,131 B2 | 5/2006 | McCabe et al. |
| 7,247,692 B2 | 7/2007 | Laredo |
| 7,249,848 B2 | 7/2007 | Laredo et al. |
| 7,276,544 B2 | 10/2007 | Lai et al. |
| 7,396,890 B2 | 7/2008 | Zanini et al. |
| 7,461,937 B2 | 12/2008 | STeffen et al. |
| 7,468,398 B2 | 12/2008 | Nicolson et al. |
| 7,538,146 B2 | 5/2009 | Nicolson et al. |
| 7,553,860 B2 | 6/2009 | Old |
| 7,553,880 B2 | 6/2009 | Nicolson et al. |
| 7,572,841 B2 | 8/2009 | Chen et al. |
| 7,666,921 B2 | 2/2010 | McCabe et al. |
| 7,691,916 B2 | 4/2010 | McCabe et al. |
| 7,691,918 B2 | 4/2010 | Jinkerson et al. |
| 7,728,051 B2 | 6/2010 | Weinschenk, III et al. |
| 7,781,571 B2 | 8/2010 | Weinschenk, III et al. |
| 7,786,185 B2 | 8/2010 | Rathore et al. |
| 7,803,359 B1 | 9/2010 | Jinkerson et al. |
| 7,825,170 B2 | 11/2010 | Steffen et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,026,326 B2 | 9/2011 | Benz et al. |
| 8,043,607 B2 | 10/2011 | Jinkerson |
| 8,113,655 B1 | 2/2012 | Tyrin et al. |
| 8,138,290 B2 | 3/2012 | Blackwell et al. |
| 8,153,703 B2 | 4/2012 | Laredo |
| 8,163,206 B2 | 4/2012 | Chang et al. |
| 8,207,244 B2 | 6/2012 | Laredo |
| 8,236,053 B1 | 8/2012 | Freeman |
| 8,262,947 B2 | 9/2012 | Laredo |
| 8,262,948 B2 | 9/2012 | Laredo et al. |
| 8,273,802 B2 | 9/2012 | Laredo et al. |
| 8,323,631 B2 | 12/2012 | Jinkerson |
| 8,329,775 B2 | 12/2012 | Laredo |
| 8,360,574 B2 | 1/2013 | Ishak et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,711 B2 | 4/2013 | Awasthi et al. |
| 8,450,387 B2 | 5/2013 | McCabe et al. |
| 8,470,906 B2 | 6/2013 | Rathore et al. |
| 8,476,390 B2 | 7/2013 | Benz et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,585,938 B1 | 11/2013 | Jinkerson et al. |
| 8,618,323 B2 | 12/2013 | Benz et al. |
| 8,637,621 B2 | 1/2014 | Iwata et al. |
| 8,697,770 B2 | 4/2014 | Duis et al. |
| 8,703,891 B2 | 4/2014 | Broad |
| 8,784,867 B2 | 7/2014 | Samuel et al. |
| 8,807,745 B2 | 8/2014 | Nunez et al. |
| 8,940,812 B2 | 1/2015 | Reboul et al. |
| 8,980,972 B2 | 3/2015 | Driver |
| 9,005,700 B2 | 4/2015 | Bothe et al. |
| 9,056,878 B2 | 6/2015 | Fujisawa et al. |
| 9,057,821 B2 | 6/2015 | Broad et al. |
| 9,125,829 B2 | 9/2015 | Bonda et al. |

(56) References Cited

U.S. PATENT DOCUMENTS

| | | |
|---|---|---|
| 9,145,383 B2 | 9/2015 | Bonda et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,249,249 B2 | 2/2016 | Awasthi et al. |
| 9,260,544 B2 | 2/2016 | Rathore et al. |
| 9,278,949 B2 | 3/2016 | Loccufier |
| 9,297,928 B2 | 3/2016 | Molock et al. |
| 9,297,929 B2 | 3/2016 | Scales et al. |
| 9,315,669 B2 | 4/2016 | Holland et al. |
| 9,611,246 B2 | 4/2017 | Bonda et al. |
| 9,637,444 B2 | 5/2017 | Qian |
| 9,667,800 B2 | 5/2017 | Rodriguez et al. |
| 9,733,493 B2 | 8/2017 | Wooley |
| 9,765,051 B2 | 9/2017 | Bonda et al. |
| 9,867,800 B2 | 1/2018 | Bonda et al. |
| 9,926,289 B2 | 3/2018 | Bonda et al. |
| 9,927,635 B2 | 3/2018 | Ishak et al. |
| 9,957,258 B2 | 5/2018 | Kunimoto et al. |
| 10,113,075 B2 | 10/2018 | Nesvadba et al. |
| 10,254,443 B2 | 4/2019 | Mccabe et al. |
| 10,268,053 B2 | 4/2019 | Holland et al. |
| 10,338,408 B2 | 7/2019 | Bothe et al. |
| 10,597,515 B2 | 3/2020 | Nesvadba et al. |
| 10,935,695 B2 * | 3/2021 | Mahadevan ............. G02B 1/04 |
| 11,401,400 B2 | 8/2022 | Shishino et al. |
| 11,543,683 B2 * | 1/2023 | Mahadevan .......... C09B 69/109 |
| 11,820,899 B2 | 11/2023 | Mahadevan et al. |
| 11,993,037 B1 | 5/2024 | Mahadevan et al. |
| 2002/0042653 A1 | 4/2002 | Copeland et al. |
| 2004/0070726 A1 | 4/2004 | Ishak |
| 2005/0018131 A1 | 1/2005 | Ishak |
| 2005/0055090 A1 | 3/2005 | Lai et al. |
| 2005/0055091 A1 | 3/2005 | Lai et al. |
| 2005/0243272 A1 * | 11/2005 | Mainster ............... A61F 2/1659 351/159.24 |
| 2005/0254003 A1 | 11/2005 | Jani et al. |
| 2006/0092374 A1 | 5/2006 | Ishak |
| 2006/0252850 A1 | 11/2006 | Jani et al. |
| 2007/0092830 A1 | 4/2007 | Lai et al. |
| 2007/0092831 A1 | 4/2007 | Lai et al. |
| 2007/0100018 A1 | 5/2007 | Hagting et al. |
| 2007/0216861 A1 | 9/2007 | Ishak et al. |
| 2008/0002147 A1 | 1/2008 | Haywood et al. |
| 2008/0221674 A1 | 9/2008 | Blum et al. |
| 2010/0048847 A1 | 2/2010 | Broad |
| 2010/0113641 A1 | 5/2010 | Laredo |
| 2010/0168359 A1 | 7/2010 | Domschke et al. |
| 2010/0321632 A1 | 12/2010 | Sanger |
| 2011/0245818 A1 | 10/2011 | Weinschenk, III |
| 2011/0249234 A1 | 10/2011 | Duis et al. |
| 2012/0010703 A1 | 1/2012 | Paul et al. |
| 2012/0053313 A1 | 3/2012 | Higgs et al. |
| 2012/0196951 A1 | 8/2012 | Mentak |
| 2012/0262792 A1 | 10/2012 | Goldberg et al. |
| 2013/0009059 A1 | 1/2013 | Caruso |
| 2013/0057824 A1 | 3/2013 | Harding et al. |
| 2013/0095235 A1 | 4/2013 | Bothe et al. |
| 2013/0158150 A1 | 6/2013 | Zhang et al. |
| 2013/0168617 A1 | 7/2013 | Alli et al. |
| 2013/0172440 A1 | 7/2013 | Alli et al. |
| 2013/0217620 A1 | 8/2013 | Alli et al. |
| 2014/0024791 A1 | 1/2014 | Alli et al. |
| 2014/0031447 A1 | 1/2014 | Alli et al. |
| 2014/0044654 A1 | 2/2014 | Bonda et al. |
| 2014/0050681 A1 | 2/2014 | Bonda et al. |
| 2014/0093661 A1 | 4/2014 | Trajkovska et al. |
| 2014/0178595 A1 | 6/2014 | Bothe et al. |
| 2015/0092155 A1 | 4/2015 | Chang et al. |
| 2015/0094393 A1 * | 4/2015 | Holland ................. C08L 83/04 522/66 |
| 2015/0094395 A1 | 4/2015 | Alli et al. |
| 2015/0164852 A1 | 6/2015 | Bonda et al. |
| 2015/0175732 A1 | 6/2015 | Awasthi et al. |
| 2015/0316688 A1 | 11/2015 | Cefalo et al. |
| 2016/0002200 A1 | 1/2016 | Bonda et al. |
| 2016/0022555 A1 | 1/2016 | Bonda et al. |
| 2016/0170093 A1 | 6/2016 | Laredo et al. |
| 2017/0038605 A1 | 2/2017 | Legerton |
| 2017/0075137 A1 | 3/2017 | Lin et al. |
| 2017/0131574 A1 | 5/2017 | Lee |
| 2017/0184878 A1 | 6/2017 | Duis et al. |
| 2017/0227790 A1 | 8/2017 | Lin et al. |
| 2017/0261768 A1 | 9/2017 | Ambler et al. |
| 2018/0037690 A1 | 2/2018 | Aitken et al. |
| 2018/0164608 A1 | 6/2018 | Schmeder et al. |
| 2018/0208583 A1 | 7/2018 | Kunimoto et al. |
| 2018/0263951 A1 | 9/2018 | Bonda et al. |
| 2018/0371139 A1 | 12/2018 | Mahadevan et al. |
| 2019/0002415 A1 | 1/2019 | Mahadevan et al. |
| 2019/0002459 A1 | 1/2019 | Mahadevan et al. |
| 2019/0121162 A1 | 4/2019 | Alli et al. |
| 2019/0169438 A1 | 6/2019 | Fromentin et al. |
| 2019/0179170 A1 | 6/2019 | Chang et al. |
| 2019/0271798 A1 | 9/2019 | Mahadevan et al. |
| 2020/0347166 A1 | 11/2020 | Alli et al. |
| 2020/0347167 A1 | 11/2020 | Alli et al. |
| 2020/0399429 A1 | 12/2020 | Alli et al. |
| 2020/0407324 A1 | 12/2020 | Mahadevan et al. |
| 2020/0407337 A1 | 12/2020 | Mahadevan |
| 2021/0061934 A1 | 3/2021 | Martin et al. |
| 2022/0194944 A1 | 6/2022 | Mahadevan |
| 2022/0340760 A1 | 10/2022 | Nankivil et al. |
| 2023/0066936 A1 | 3/2023 | Buch et al. |
| 2023/0085695 A1 | 3/2023 | Buch et al. |
| 2023/0117655 A1 | 4/2023 | Mahadevan et al. |
| 2023/0288728 A1 | 9/2023 | Mahadevan et al. |
| 2023/0296807 A1 | 9/2023 | Aitken et al. |

FOREIGN PATENT DOCUMENTS

| | | |
|---|---|---|
| CN | 106366241 A | 2/2017 |
| CN | 108586289 A | 9/2018 |
| EP | 0080539 B1 | 6/1983 |
| EP | 0131468 B1 | 1/1985 |
| EP | 0924203 A1 | 6/1999 |
| EP | 1870735 A1 | 12/2007 |
| EP | 2123638 A1 | 11/2009 |
| EP | 3052534 B1 | 8/2016 |
| EP | 3419961 A1 | 1/2019 |
| EP | 3419961 B1 | 9/2020 |
| GB | 217810 | 6/1924 |
| GB | 2319035 A | 5/1998 |
| JP | H0743918 A | 2/1995 |
| JP | 2004243596 A | 9/2004 |
| JP | 2004277581 | 10/2004 |
| JP | 200850463 A | 3/2008 |
| JP | 4627009 B2 | 2/2011 |
| JP | 2011219512 A | 11/2011 |
| JP | 5544017 B2 | 7/2014 |
| JP | 2016133593 A | 7/2016 |
| RU | 2175321 C2 | 10/2001 |
| RU | 2196557 C2 | 1/2003 |
| RU | 2197907 C2 | 2/2003 |
| RU | 2294132 C2 | 10/2006 |
| RU | 2466173 C1 | 11/2012 |
| RU | 2481606 C1 | 5/2013 |
| RU | 2540655 C2 | 9/2014 |
| RU | 2557993 C1 | 7/2015 |
| RU | 2577800 C2 | 3/2016 |
| RU | 2628462 C2 | 8/2017 |
| WO | 1999063366 A1 | 12/1999 |
| WO | 2001030866 A1 | 5/2001 |
| WO | 200212205 A1 | 2/2002 |
| WO | 200242281 A1 | 5/2002 |
| WO | 2003022321 A2 | 3/2003 |
| WO | 2003089519 A1 | 10/2003 |
| WO | 2007050395 A2 | 5/2007 |
| WO | 2008061992 A2 | 5/2008 |
| WO | 2011130139 A1 | 10/2011 |
| WO | 2013055746 A1 | 4/2013 |
| WO | 2013188825 A1 | 12/2013 |
| WO | 2014018208 A1 | 1/2014 |
| WO | 2014025370 A1 | 2/2014 |

(56) References Cited

FOREIGN PATENT DOCUMENTS

| WO | 2014026151 A1 | 2/2014 |
|---|---|---|
| WO | 2015048035 A1 | 4/2015 |
| WO | 2015155748 A1 | 10/2015 |
| WO | 2016100457 A1 | 6/2016 |
| WO | 2016175619 A1 | 11/2016 |
| WO | 2017/073467 A1 | 5/2017 |
| WO | 2017106322 A1 | 6/2017 |
| WO | 2019166971 A1 | 9/2019 |
| WO | 2020261021 A1 | 12/2020 |
| WO | 2020261091 A1 | 12/2020 |

OTHER PUBLICATIONS

Das et al., "In vitro and schematic model eye assessment of glare or positive dysphotopsia-type photic phenomena: comparison of a new material IOL to other monofocal IOLs", Journal of Cataract Refractive Surgery, vol. 45, Issue 2, pp. 219-227, Feb. 2019.
Elsherif et al., "Contact Lenses for Color Vision Deficiency", Advanced Materials Technologies, vol. 6, Issue 1, pp. 1-9, Jan. 2021.
Foster et al., "Frequency of Metamerism in Natural Scenes", Journal of the Optical Society of America A, vol. 23, No. 10, pp. 2359-2372, Oct. 2006.
Harris et al., "Effect of Tinted Contact Lenses on Color Vision", Am J Optom Physiol Opt., vol. 53, No. 3, pp. 145-148, Mar. 1976.
Laxer, "Soft Tinted Contact Lenses and Color Discrimination", International Contact Lens Clinic, vol. 17, pp. 88-91, Mar.-Apr. 1990.
Macleod et al., "Chromaticity Diagram Showing Cone Excitation by Stimuli of Equal Luminance", Journal of the Optical Society of America, vol. 69, Issue 8, pp. 1183-1186, Aug. 1979.
Mencucci et al., "Visual Outcome, Optical Quality and Patients' Satisfaction with a New Monofocal Intraocular Lens, Enhanced for Intermediate Vision: Preliminary Results", Journal of Cataract and Refractive Surgery, vol. 46, Issue 3, pp. 378-387, Mar. 2020.
Miao et al., "Objective Optical Quality and Intraocular Scattering in Myopic Adults", Investigative Ophthalmology & Visual Science, vol. 55, No. 9, pp. 5582-5587, Sep. 2014.
Mostafa et al., "The Effect of Age and Gender on Tear Film Breakup Time", In Egyptian Journal of Medical Research, vol. 2, Issue 2, 11 pages, 2021.
Nascimento et al., "Statistics of Spatial Cone-excitation Ratios in Natural Scenes", Journal of the Optical Society of America A, vol. 19, Issue 8, pp. 1484-1490, Aug. 2002.
Parraga et al., "Color and Luminance Information in Natural Scenes", Journal of the Optical Society of America A, vol. 15, No. 3, pp. 563-569, Mar. 1998.
Patel et al., "Effect of Visual Display Unit Use on Blink Rate and Tear Stability", In Optom Visual Sci, vol. 68, Issue 11, pp. 888-892, Nov. 1991.
Pokorny et al., "Aging of the Human Lens", Applied Optics, vol. 26, No. 8, pp. 1437-1440, Apr. 1987.
Stockman et al., "The Spectral Sensitivities of the Middle- and Long-wavelength-sensitive Cones Derived from Measurements in Observers of Known Genotype", Vision Research, vol. 40, pp. 1711-1737, 2000.
Tan et al., "Dynamic Change of Optical Quality in Patients with Dry Eye Disease", In Invest Ophthalmol Vis Sci., vol. 56, Issue 5, pp. 2848-2854, May 2015.
Tester et al., "Dysphotopsia in phakic and pseudophakic patients: incidence and relation to intraocular lens type", In Journal of Cataract Refractive Surgery, vol. 26, Issue 6, pp. 810-816, Jun. 2000.
Tsubota et al., "Dry Eyes and Video Display Terminals", In New England Journal of Medicine, vol. 328, Issue 8, p. 584, Feb. 25, 1993.
Van den Berg, T. J. T. P, "Importance of Pathological Intraocular Light Scatter for Visual Disability." In Documenta Ophthalmologica, vol. 61, pp. 327-333, 1986.

Xi et al., "Assessment of Tear Film Optical Quality in a Young Short Tear Break-up Time Dry Eye: Case-control study", Medicine, vol. 98, Issue 40, pp. 1-6, 2019.
Fadli et al, "Permeation and Pervaporation of Water through Contact Lens Materials," Johnson & Johnson Vision Care, Inc., Jacksonville, FL, USA; 8th International Conference on the Tear Film & Ocular Surface: Basic Science and Clinical Relevance; Montpellier, France, Sep. 7-10, 2016.
Beatty et al., "Macular pigment and age related macular degeneration," Br. J. Ophthalmol. 1999, vol. 83, pp. 867-877.
Belusa, J. et al, 2-(2-Hydroxyphenyl)benzotriazoles. I. Synthesis and their ultraviolet and infrared spectra, Chem.zvesti 1974, vol. 28, No. 5, pp. 673-679.
Bernstein et al., "Lutein, zeaxanthin, and meso-zeaxanthin: The basic and clinical science underlying carotenoid-based nutritional interventions against ocular disease," Progress in Retinal and Eye Research, vol. 50, pp. 34-66, (2016).
Berthon, et al., Synthesis, Electrochemical and Spectroscopic Properties of Pendant Hydroquinone-And Quinone-Substitued Polypyridyl Ruthenium (11) Complex, Inorganica Chimica Acta, 1993, pp. 3-7, vol. 204.
Bondyreva E. Y., "Polimerization", Methodological Guidelines for Independent Work. Nizhnekamsk Chemical and Technological Institute of the Federal State Budget Educational Institution of Higher Professional Education "Kazan National Research Technological University", Nizhnekamsk, 2014, pp. 4-13.
Boon et al., "Factors Influencing the Chemical Stability of Carotenoids in Foods," Critical Reviews in Food Science and Nutrition, vol. 50, pp. 515-532 (2010).
Burton et al., "B-Carotene autoxidation: oxygen copolymerization, non-vitamin A products, and immunological activity," Can. J. Chem., vol. 92, pp. 305-316 (2014).
Chen et al, Dicyanomethylenated Acridone Based Crystals: Torsional Vibration Confinement Induced Emission with Supramolecular Structure Dependent and Stimuli Responsive Characteristics, The Journal of Physical Chemistry, 2016, 587-597, 120.
Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.
Crivello, et al, Photoinitiators for Free Radical Cationic & Anionic Photopolymerisation, 2nd Edition, vol. III, pp. 275-298, John Wiley and Sons, New York, 1998.
Doutch et al, Ultraviolet Light Transmission through the Human Corneal Stroma Is Reduced in the Periphery, Biophysical Journal, vol. 102, Mar. 2012, pp. 1258-1264.
Hafez et al, Carbonyl and Thiocarbonyl Compounds. V. Synthesis of Newer Unsaturated Nitriles, Carboxylic Acids, and Esters Derived from Xanthene and Thiaxanthene, Journal of Organic Chemistry, vol. 26, pp. 3988-3991, Oct. 1961.
Ham et al., "Retinal sensitivity to damage from short wavelength light." Nature, vol. 260 (1976), pp. 153-155.
Hammond et al, Contralateral comparison of blue-filtering and non-blue-filtering intraocular lenses: glare disability, heterochromatic contrast, and photostress recovery, Clinical Ophthalmology, 2010, pp. 1465-1473, vol. 4, Dovepress, US.
International Conference on Harmonisation (ICH) of Technical Requirements for Registration of Pharmaceuticals for Human Use guideline, Q1B Photostability Testing of New Drug Substances and Products, published on Nov. 1996.
Jockusch et al, Photostabilization of Endogenous Porphyrins: Excited State Quenching by Fused Ring Cyanoacrylates, Photchemical & Photobiological Sciences, 2014, vol. 13, No. 8, pp. 1180-1184.
Johnston et al., "Biologically Active Polymers from Spontaneous Carotenoid Oxidation: A New Frontier in Carotenoid Activity," Plos One, vol. 9, Issue 10, pp. 1-10 (Oct. 2014).
Kolpashchikova et al., "Organic Chemistry" Part II. Arenes. Halogened Hydrocarbons. Ministry of Education of the Russian Federation. Yaroslavl State Technical University, 1999, p. 14.
Larn, et al., Synthesis of Dinucleating Phenanthroline-Based Ligands, Tetrahedron, Jul. 9, 1999, pp. 8377-8384, vol. 55 Issue 28.

(56) References Cited

OTHER PUBLICATIONS

Latif et al, Cleavage of Xanthene Ethers A New Route to 9-Substituted Xanthenes, Canadian Journal of Chemistry, vol. 42 (1964), pp. 1736-1740.
Luning, et al., Bimacrocylic 1,10-Phenanthroline Cyclophanes, Chemische Beri, 1990, pp. 643-645, vol. 123 Issue 3.
Nishino, et al., Manganese (111)-Mediated Carbon-Carbon Bond Formation In The Reaction Of Xanthenes With Active Methylene Compounds, The journal of organic chemistry, Jan. 1, 1992, pp. 3551-3557, vol. 57.
PCT International Preliminary Report on Patentability, dated Mar. 1, 2022, for PCT Int'l Appln. No. PCT/IB2020/057732.
PCT International Preliminary Report on Patentability, dated Mar. 1, 2022, for PCT Int'l Appln. No. PCT/IB2020/057733.
PCT International Preliminary Report on Patentability, dated Sep. 8, 2020, for PCT Int'l Appln. No. PCT/IB2019/051582.
PCT International Preliminary Report on Patentability, dated Dec. 28, 2021, for PCT Int'l Appln. No. PCT/IB2020/055485.
PCT International Preliminary Report on Patentability, dated Dec. 28, 2021, for PCT Int'l Appln. No. PCT/IB2020/055868.
PCT International Search Report, dated Mar. 1, 2022, for PCT Int'l Appln. No. PCT/IB2021/061175.
PCT International Search Report, dated Oct. 9, 2020, for PCT Int'l Appln. No. PCT/IB2020/057732.
PCT International Search Report, dated Oct. 9, 2020, for PCT Int'l Appln. No. PCT/IB2020/057733.
PCT International Search Report, dated Jul. 23, 2020, for PCT Int'l Appln. No. PCT/IB2020/055485.
PCT International Search Report, dated Sep. 23, 2020, for PCT Int'l Appln. No. PCT/IB2020/055868.
PCT International Search Report, dated May 24, 2019, for PCT Int'l Appln. No. PCT/IB2019/051582.
Reck, et al., Enantiopure Chiral Chiral Concave 1,10-Phenanthrolines, European Journal of Organic Chemistry, 2016, pp. 1119-1131, vol. 2016 Issue 6.
Ribeiro et al., "Antioxidant and pro-oxidant activities of carotenoids and their oxidation products," Food and Chemical Toxicology, vol. 120, pp. 681-699 (2018).
Riederer et al, "New Methods for Measuring Water Transport through Hydrogel Contact Lenses" (Poster), The Association for Research in Vision and Ophthalmology, May 7-11, 2017 Baltimore, MD, JJVCI Pubstrat # 45222.
Riederer et al, "Permeation and Pervaporation of Water through Contact Lens Materials," (Oral Presentation) American Academy of Optometry, Nov. 9-12, 2016 Anaheim, CA, JJVCI Pubstrat # 44835.
Riederer et al, "Pervaporation as a Metric for Evaporative Water Loss from Contact Lenses," The Association for Research in Vision and Ophthalmology annual meeting (ARVO), Jun. 2020. (Virtual Presentation).
Riederer et al, "Water Loss from Contact Lenses: Material Dependent Rates of Evaporation and Permeation" (Poster), British Contact Lens Association, Jun. 9-11, 2017, Liverpool, UK JJVCI Pubstrat # 45327.
Riederer et al, "Water Loss from Contact Lenses: Material Dependent Rates of Evaporation and Permeation," European Contact Lens Society of Ophthalmologists (ECLSO), Dec. 1-2, 2017, London, UK Presented by Rachel Hiscox**, *Johnson & Johnson Vision Care Inc., Florida USA, ** Johnson & Johnson Vision, UK.
Riederer, "Evaporation Rates from Hydrogel Contact Lenses Using Dynamic Vapor Sorption", 1st North American Symposium on Dynamic Vapor Sorption, Sep. 17-18, 2018 Philadelphia, PA (Invited talk).
Sato, et al., Synthesis and characterization of electron transporting polymers having thioxanthene derivatives, Synthetic Metals, Jan. 1, 1999, pp. 55-60, vol. 105.
Selvam, et al., Tunable anchoring groups@acridone-linked triphenylamine based pendant chromophores and their effects on the photovoltaic performance as sensitizers for dye-sensitized solar cellst, RSC Advances, Jan. 1, 2016, pp. 109054-109060, vol. 6 Issue 110.
Statement on Ocular Ultraviolet Radiation Hazards in Sunlight, American Optometric Association, Nov. 10, 1993.
Stringham et al., "Macular Pigment and Visual Performance in Glare: Benefits for Photostress Recovery, Disability Glare, and Visual Discomfort," IOVS, Sep. 2011, vol. 52, No. 10, pp. 7406-7415.
Sutjagin et al, "Chemistry and Physics of Polymers," Training Manual. TPU Publishing House, Tomsk, 2003, Chapter 1, p. 9, Chapter 2, pp. 19-56.
Takeda et al, Anisotropic Dissociation of $\pi$-$\pi$ Stacking and Flipping-Motion-Induced Crystal Jumping in Alkylacridones and Their Dicyanomethylene Derivatives, Chem. Eur. J., 2016, 7763-7770, 22.
Ty et al., "Oxidation and Thermal Degradation of Carotenoids," Journal of Oil Palm Research, vol. II, No. 1, pp. 62-78 (Jun. 1999).
Belikov, V.G., "The Relationship Between Chemical Structure, Properties of Substances and Their Effect on the Organism", Pharmaceutical Chemistry, pp. 27-29, 2007.
Dyson et al., "Chemistry of Synthetic Drugs Substances", Moscow: Mir, 18 pages, 1964.
International Search Report and Written Opinion, received for PCT Application No. PCT/IB2018/053669, mailed on Jul. 17, 2018, 14 pages.
International Search Report and Written Opinion, received for PCT Application No. PCT/IB2018/054585, mailed on Nov. 9, 2018, 12 pages.
International Search Report and Written Opinion, received for PCT Application No. PCT/IB2018/054588, mailed on Oct. 4, 2018, 17 pages.
International Search Report and Written Opinion, received for PCT Application No. PCT/IB2023/055938, mailed on Oct. 18, 2023, 12 pages.
ISO 18369-3, "Ophthalmic Optics—Contact lenses", Measurement methods, Part 3, 44 pages, Aug. 15, 2006.
ISO 18369-4, "Ophthalmic Optics—Contact Lenses-Part 4: Physicochemical Properties of Contact Lens Materials", International Organization for Standardization, Aug. 15, 2006, 38 pages.
ISO 9913-1, "Optics and Optical Instruments—Contact Lenses—Part 1: Determination of Oxygen Permeability and Transmissibility by the FATT Method", International Organization for Standardization, Nov. 1, 1996, 16 pages.
PCT International Preliminary Report on Patentability, dated Jun. 13, 2023, for PCT Int'l Appln. No. PCT/IB2021/061175.
Fletcher et al., "Visibility Through Atmospheric Haze and Its Relation to Macular Pigment", Optometry and Vision Science, vol. 91, No. 09, pp. 1089-1096, 2014.
Hammond et al., "The Influence of Filtering by the Macular Carotenoids on Contrast Sensitivity Measured Under Simulated Blue Haze Conditions", Vision research, vol. 63, pp. 58-62, Jun. 15, 2012.
Kelly, Susan A., "Effect of Yellow-tinted Lenses on Brightness", Journal of the Optical Society of America A, vol. 07, No. 10, pp. 1905-1911, 1990.
Liu, Zhuo., "Tutorial on Modern Rock and Mineral Analytic Experiments", Geological Press, 42 Pages, Oct. 31, 2015.
Wooten et al., "Macular Pigment: Influences on Visual Acuity and Visibility", Progress in Retinal and Eye Research, vol. 21, No. 02, pp. 225-240, Mar. 2002.
Unpublished U.S. Appl. No. 18/871,664, filed Dec. 4, 2024, 103 pages.

* cited by examiner

FIG. 1 – UV-VIS Transmission Spectrum of Silicone Hydrogel Contact Lenses 4A and 4B FIG. 2 – UV-VIS Transmission Spectrum of Silicone Hydrogel Contact Lenses 4A and 4C FIG. 3 – UV-VIS Transmission Spectrum of Silicone Hydrogel Contact Lenses 4A and 4D FIG. 4. Glare Discomfort FIG. 5. Glare disability threshold FIG. 6. Heterochromatic contrast threshold

FIG. 7. Halos

FIG. 8. Starbursts

FIG. 9. Light scatter

FIG. 10. Light Scatter

FIG. 11. Photostress recovery time

FIG. 12. Pervaporation Rate

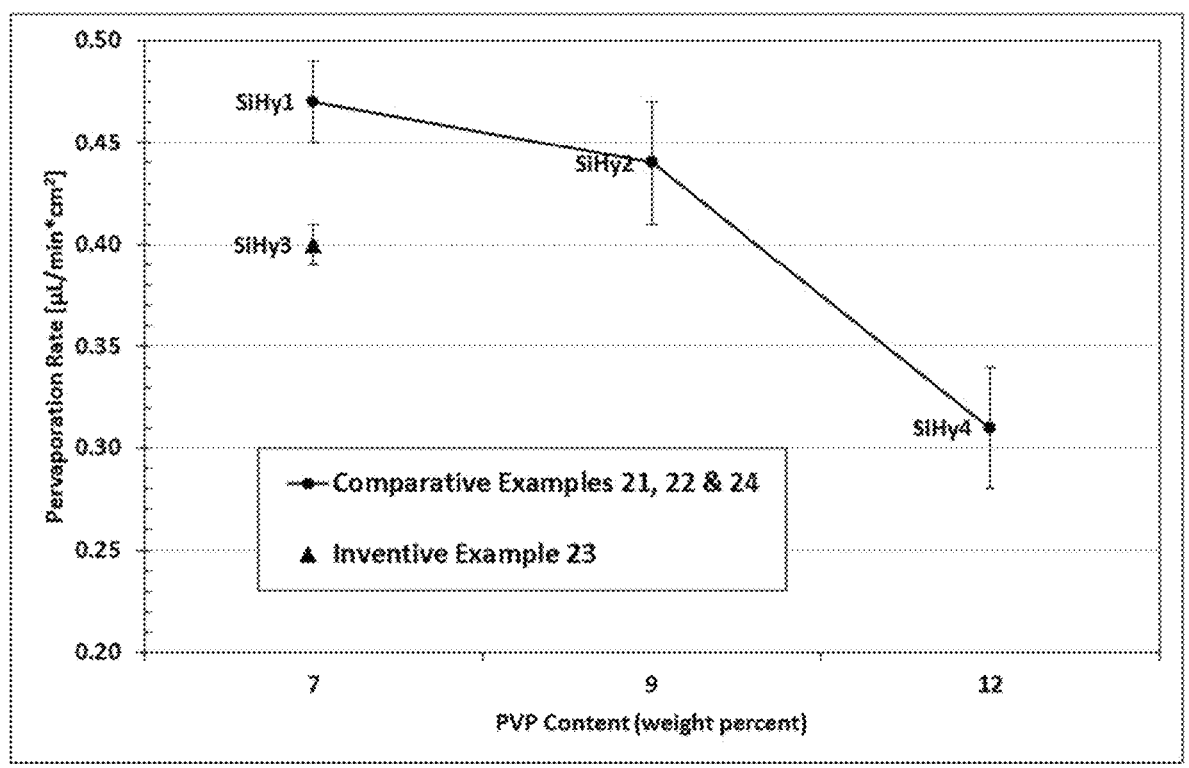
FIG. 15. Plot of Pervaporation Rate versus PVP Content

POLYMERIZABLE ABSORBERS OF UV AND HIGH ENERGY VISIBLE LIGHT

RELATED APPLICATIONS

This application is a continuation-in-part of U.S. patent application Ser. No. 16/938,117, filed Jul. 24, 2020, which claims priority to U.S. Provisional Patent Application Ser. No. 62/893,996, filed Aug. 30, 2019, and is a continuation-in-part of U.S. patent application Ser. No. 17/110,443, filed Dec. 3, 2020, which is a continuation of U.S. patent application Ser. No. 16/268,897, filed on Feb. 6, 2019, now U.S. Pat. No. 10,935,695, which claims priority to U.S. Provisional Patent Application Ser. No. 62/691,112, filed Jun. 28, 2018, and U.S. Provisional Patent Application Ser. No. 62/637,505, filed Mar. 2, 2018, each of which is incorporated herein by reference in its entirety.

FIELD OF THE INVENTION

The invention relates to contact lenses that contain high energy visible light absorbing compounds and their use for improving one or more vision attributes and other properties.

BACKGROUND OF THE INVENTION

High energy light from the sun, such as UV light and high-energy visible light, is known to be responsible for cellular damage. While most of the radiation below 280 nm in wavelength is absorbed by the earth's atmosphere, photons possessing wavelengths ranging between 280 and 400 nm have been associated with several ocular disorders including corneal degenerative changes, and age-related cataract and macular degeneration. (See Statement on Ocular Ultraviolet Radiation Hazards in Sunlight, American Optometric Association, Nov. 10, 1993). The human cornea absorbs some radiation up to 320 nm in wavelength (30% transmission) (Doutch, J. J., Quantock, A. J., Joyce, N. C., Meek, K. M, *Biophys. J*, 2012, 102, 1258-1264), but is inefficient in protecting the back of the eye from radiation ranging from 320 to 400 nm in wavelength.

Contact lens standards define the upper UV radiation wavelength at 380 nm. The current Class I UV absorbing criteria defined by the American Optometric Association require >99% of the radiation between 280 and 315 nm (UV B) and >90% of the 316 to 380 nm (UV A) radiation to be absorbed by the contact lens. While the criteria effectively address protection of the cornea (<1% UV B transmittance), there is little attention paid to the lower energy UV or violet radiation (>380<400 nm) associated with retinal damage (Ham, W. T, Mueller, H. A., Sliney, D. H. *Nature* 1976; 260(5547):153-5) or to HEV radiation.

High energy-visible (HEV) radiation may cause visual discomfort or circadian rhythm disruption. For example, computer and electronic device screens, flat screen televisions, energy efficient lights, and LED lights are known to generate HEV light. Prolonged exposure to such sources of HEV light may cause eye strain. Viewing HEV light emitting devices at night is also postulated to disrupt the natural circadian rhythm leading, for example, to inadequate sleep.

Shorter blue-violet wavelengths are more uncomfortable to view than longer orange-red wavelengths (assuming equal energy output) and scattering within the eye is known to decrease the contrast of objects (Van Den Berg, T J T P, Importance of pathological intraocular light scatter for visual disability, *Documenta Ophthalmologica*, 1986; 61(3-4):327-333). Further, scatter, especially from violet light, is associated with greater halos and starbursts, which are more prevalent at night and may be a significant issue for drivers (Das, K K, Werner, L, Collins, S, Hong X, In vitro and schematic model eye assessment of glare or positive dysphotopsia-type photic phenomena: Comparison of a new material IOL to other monofocal IOLs, *Journal of Cataract and Refractive Surgery*, 2019; 45(2):219-227; Tester, R, Pace, N L, Samore, M, Olson, R J, Dysphotopsia in phakic and pseudophakic patients: incidence and relation to intraocular lens type, *Journal of Cataract and Refractive Surgery*, 2000; 26(6):810-816).

Absorption of high energy light radiation before it reaches the eye therefore continues to be a desirable goal in the ophthalmic field. However, the extent to which a particular wavelength range is absorbed is also important. For instance, in the UV A and UV B ranges, it may be desirable to absorb as much radiation as possible. On the other hand, since HEV light forms a part of the visible spectrum, complete absorption of HEV light may negatively affect vision. With HEV light, therefore, partial absorption may be more desirable.

The increased use of digital devices in recent years has further exacerbated visual issues, beyond exposure to HEV light. For instance, using digital devices for prolonged periods of time may decrease blinking, which can contribute to the development of dry eye symptoms (Tsubota, K, Nakamori, K., Dry eyes and video display terminals, *N Engl J Med.*, 1993; 328(8):584; Pattel, S, Henderson, R, Bradley, L, et al., Effect of visual display unit use on blink rate and tear stability, *Optom. Vis. Sci.*, 1991; 68(11):888-892). Dry eye symptoms may also be experienced in lower humidity environments. In contact lens wearers, such symptoms may lead to reduced comfort.

There is a need for materials that provide targeted absorption of undesirable wavelengths of high energy radiation, and that are processable into functional products. Compounds that absorb or attenuate high energy radiation, when used in ophthalmic devices, can help protect the cornea, as well as the interior cells in the ocular environment, from degradation, strain, and/or circadian rhythm disruption. There is also a need for materials that help mitigate the negative issues caused by dry eye resulting, for instance, from decreased blinking during prolonged use of digital devices, or from use of lenses in lower humidity environments.

SUMMARY OF THE INVENTION

The invention relates to contact lenses that contain HEV filtering compounds. The HEV filtering compounds provide various improved vision attributes to the lenses, including improvements in one or more of photostress recovery time, glare discomfort, glare disability threshold, heterochromatic contrast threshold, halo size, starburst size, and light scattering, when compared to contact lenses that do not filter HEV light.

In addition, the lenses exhibit low rates of pervaporation. Pervaporation is a process of permeation and evaporation from the lens surface. It can also be described as evaporation through a lens. Moisture in the eye and in a contact lens on the eye are generally in equilibrium. Thus loss of moisture from the surface of the lens is replenished by moisture from the eye. Excessive pervaporation from a lens, for instance in low humidity environments or because of a reduced blink rate, can therefore lead to contact lens induced dry eye (CLIDE) with eyes feeling increasingly dry. Consequently, contact lenses that provide low pervaporation rates, such as the lenses of the invention, may mitigate against moisture loss. In some instances, lenses of the invention may exhibit pervaporation rates that are about two times lower than leading commercially available lenses, including for example DAILIES TOTAL1® from Alcon, MYDAY® from CooperVision, and INFUSE™ from Bausch & Lomb.

Accordingly, in one aspect the invention provides a contact lens that is a free radical reaction product of a reactive mixture comprising: one or more monomers suitable for making the contact lens; a high energy visible (HEV) light absorbing compound; and up to eleven weight percent of a polyamide internal wetting agent. The contact lens transmits from 0 percent to 70 percent of light having a wavelength range of 400 to 409 nm, and exhibits a pervaporation rate of less than 0.47 uL/min*cm$^2$ when measured at a relative humidity of about 0 percent.

In another aspect, the invention provides a silicone hydrogel contact lens that is a reaction product of a reactive mixture comprising: a polymerizable high energy light absorbing compound; one or more monomers suitable for making the silicone hydrogel contact lens; and up to eleven weight percent of a polyamide internal wetting agent. The silicone hydrogel contact lens has a contact angle of about 70° or less, a water content of at least 25 percent, and an oxygen permeability of at least 80 barrers, is substantially photostable, and exhibits a pervaporation rate of less than 0.47 uL/min*cm$^2$ when measured at a relative humidity of about 0 percent.

In a further aspect, contact lenses are provided in which the HEV light absorbing compound is of formula I:

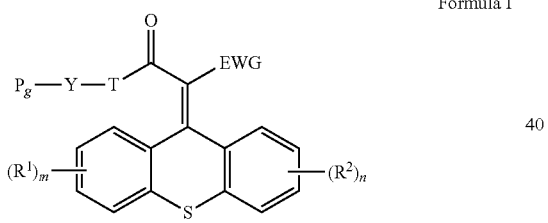

Formula I wherein:
- m and n are independently 0, 1, 2, 3, or 4;
- T is a bond, O, or NR;
- Y is a linking group;
- $P_g$ is a polymerizable group;
- R at each occurrence is independently H, $C_1$-$C_6$ alkyl, cycloalkyl, heterocycloalkyl, aryl, heteroaryl, or Y—$P_g$;
- $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring; and
- EWG is an electron withdrawing group, such as cyano, amide, ester, keto, or aldehyde (preferably cyano).

BRIEF DESCRIPTION OF DRAWINGS

FIG. 15 is a line graph of pervaporation rate versus PVP content in a lens of the invention and in various comparative lenses.

DETAILED DESCRIPTION OF THE INVENTION

Figure 1:
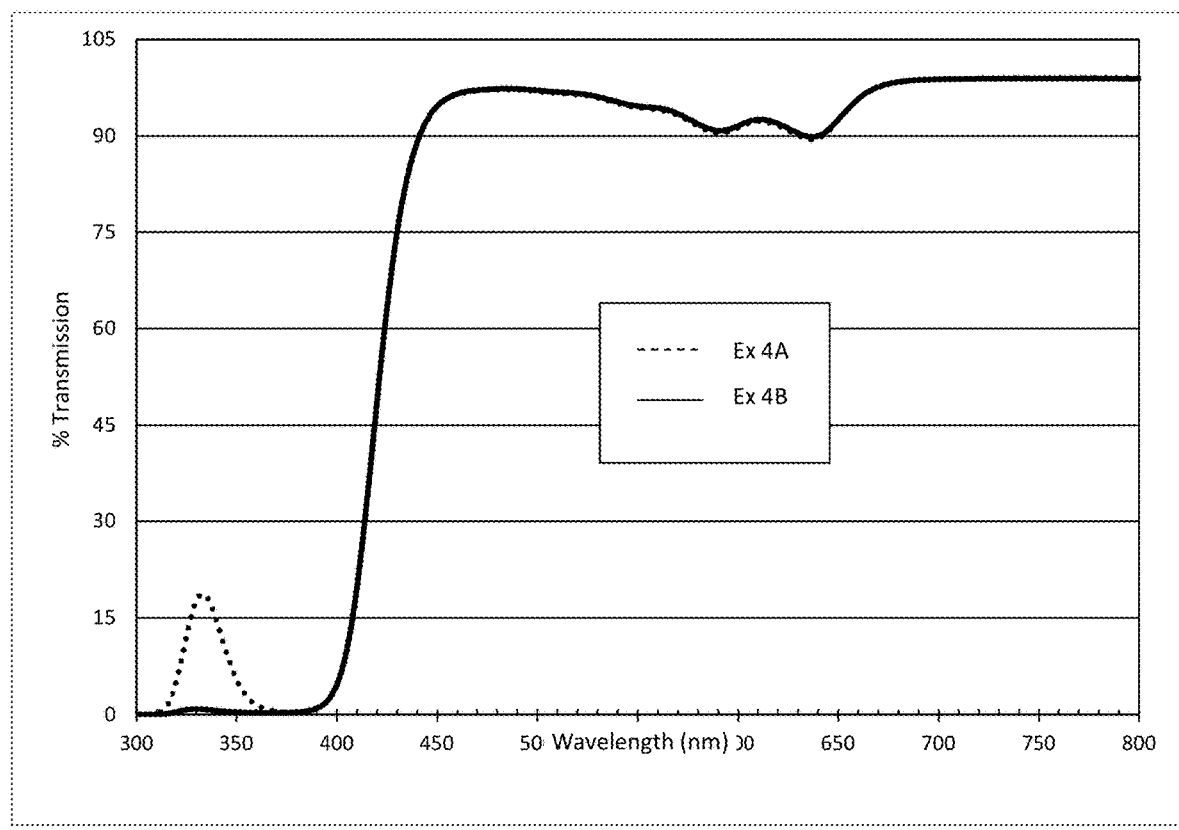
FIG. 1 shows UV-VIS transmission spectrum of silicone hydrogel contact lenses of Examples 4A and 4B.

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided. Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]$_n$, is used to depict the number of repeating units in a polymer's chemical formula, the formula should be interpreted to represent the number average molecular weight of the macromolecule.

The term "individual" includes humans and vertebrates.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The lenses of the present invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, for example a carbon-carbon double bond which can polymerize when subjected to radical polymerization initiation conditions. Non-limiting examples of free radical polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the free radical polymerizable groups comprise (meth)acrylate, (meth)acrylamide, N-vinyl lactam, N-vinylamide, and styryl functional groups, and mixtures of any of the foregoing. More preferably, the free radical polymerizable groups comprise (meth)acrylates, (meth)acrylamides, and mixtures thereof. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that can swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N,N-dimethylacrylamide ("DMA") or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

The terms "reactive mixture" and "reactive monomer mixture" refer to the mixture of components (both reactive and non-reactive) which are mixed together and, when subjected to polymerization conditions, form the conventional or silicone hydrogels of the present invention as well as contact lenses made therefrom. The reactive monomer mixture may comprise reactive components such as the monomers, macromers, prepolymers, cross-linkers, and initiators, additives such as wetting agents, polymers, dyes, light absorbing compounds such as UV absorbers, pigments, dyes and photochromic compounds, any of which may be reactive or non-reactive but are capable of being retained within the resulting contact lens, as well as pharmaceutical and nutraceutical compounds, and any diluents. It will be appreciated that a wide range of additives may be added based upon the contact lens which is made and its intended use. Concentrations of components of the reactive mixture are expressed as weight percentages of all components in the reactive mixture, excluding diluent. When diluents are used, their concentrations are expressed as weight percentages based upon the amount of all components in the reactive mixture and the diluent.

"Reactive components" are the components in the reactive mixture which become part of the chemical structure of the polymeric network of the resulting hydrogel by covalent bonding, hydrogen bonding, electrostatic interactions, the formation of interpenetrating polymeric networks, or any other means.

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as —$CH_2$—, —$CH_2CH_2$—, —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —$CH_2CH_2NH$—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_n$—, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula $R_3Si$— and "siloxy" refers to a structure of formula $R_3Si$—O—, where each R in silyl or siloxy is independently selected from trimethylsiloxy, $C_1$-$C_8$ alkyl (preferably $C_1$-$C_3$ alkyl, more preferably ethyl or methyl), and $C_3$-$C_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[$CH_2CH_2O$]$_p$— or $CH_3O$—[$CH_2CH_2O$]$_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent $CH_2$ groups have been substituted with an oxygen atom, such as —$CH_2CH_2OCH(CH_3)CH_2$—. "Thiaalkylene" refers to an alkylene group as defined above where one or more non-adjacent $CH_2$ groups have been substituted with a sulfur atom, such as —$CH_2CH_2SCH(CH_3)CH_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—$CO_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —$OCF_2$—, —$OCF_2CF_2$—, —$OCF_2CH_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include $C_1$-$C_8$ alkylene (preferably $C_2$-$C_6$ alkylene) and $C_1$-$C_8$ oxaalkylene (preferably $C_2$-$C_6$ oxaalkylene), each of which is optionally substituted with 1 or 2 groups independently selected from hydroxyl and siloxy. Preferred linking groups also include carboxylate, amide, $C_1$-$C_8$ alkylene-carboxylate-$C_1$-$C_8$ alkylene, or $C_1$-$C_8$ alkylene-amide-$C_1$-$C_8$ alkylene.

When the linking group is comprised of combinations of moieties as described above (e.g., alkylene and cycloalkylene), the moieties may be present in any order. For instance, if in Formula E below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula E, L and $L^2$ are indicated as both being alkylene-cycloalkylene, then Rg-L is preferably Rg-alkylene-cycloalkylene- and -$L^2$-Rg is preferably -cycloalkylene-alkylene-Rg.

The term "electron withdrawing group" (EWG) refers to a chemical group which withdraws electron density from the atom or group of atoms to which the electron withdrawing group is attached. Examples of EWGs include, but are not limited to, cyano, amide, ester, keto, or aldehyde. A preferred EWG is cyano (CN).

The terms "high energy radiation absorber," "UV/HEV absorber," or "high energy light absorbing compound" refer to chemical materials that absorb various wavelengths of ultraviolet light, high energy visible light, or both. The terms "high energy visible light absorbing compound" or "HEV light absorbing compound" and similar terms refer to chemical materials that absorb one or more wavelengths of high energy visible light, for instance one or more wavelengths in the range of 400 to 450 nm. A material's ability to filter certain wavelengths of light can be determined by measuring its UV/Vis transmission spectrum. Compounds that exhibit no absorption at a particular wavelength will exhibit substantially 100 percent transmission at that wavelength. Conversely, compounds that completely absorb at a particular wavelength will exhibit substantially 0% transmission at that wavelength. As used herein, unless the context clearly indicates otherwise, if the amount of a contact lens's transmission is indicated as a percentage for a particular wavelength range, it is to be understood that the material exhibits the percent transmission at all wavelengths within that range. On the other hand, reference to an "average transmission" may be calculated as the average of the percent transmission in 1 nm increments over the identified range. For purposes of the invention, a material that has a transmission of 90 percent or greater across the wavelength range of 400 to 450 nm is not an HEV light absorbing material.

The terms "photostable," "photostability," or similar expressions mean that a contact lens (containing an HEV light absorbing compound) doesn't exhibit a substantial change in its visible light transmission spectrum after exposure to light, when packaged in a clear blister pack, under conditions of the International Conference on Harmonisation (ICH) of Technical Requirements for Registration of Pharmaceuticals for Human Use guideline, Q1B Photostability Testing of New Drug Substances and Products, published on November 1996. Preferably, the exposure is conducted under the ICH Photostability Guideline using an Option 2 light source with an estimated illuminance exposure of $1.5192 \times 10^6$ Lux hours (168.8 hours exposure time) and an estimated ultraviolet irradiation exposure of 259.4 Watt hours/$m^2$ (16.2 hours exposure time), preferably in a photostability chamber that is controlled at 25° C./Amb RH. When lenses are measured within a blister pack, the blister pack is exposed foil side down to maximize irradiance from the light source during photo exposure. After exposure, the UV/Vis spectrum of the test lens is collected and compared to a control lens (a lens that was not subjected to Q1B conditions). Photostability may be represented as the percent change in average transmission of the test lens relative to the control lens at a selected wavelength range. The change may be calculated as the absolute value of the difference in the average transmission (over the selected wavelength range) between the control lens and the test lens, divided by the average transmission of the control lens (at the selected wavelength range). For purposes of this invention, a contact lens is considered to be photostable if the change in average transmission over the selected wavelength range (e.g., 380 to 450 nm) is 20 percent or less, or 15 percent or less, or 10 percent or less, or 7 percent or less, or 5 percent or less, or 2 percent or less. The measurement may, for instance, be made on a −1.00 diopter contact lens.

The term "photochromic compound" refers to a material which reversibly changes its absorption properties (i.e. color) caused by a photochemical reaction within the material upon exposure to specific wavelengths of electromagnetic radiation. By way of example, a photochromic compound may exhibit a reversible change in average transmission of 5% or more, or 10% or more, or 20% percent or more, in the visible portion of the electromagnetic spectrum (e.g., in the wavelength range of about 380 nm to about 760 nm) when exposed to UV or HEV light. A "static compound" is a material that is not photochromic, thus the material does not undergo a photochemical reaction that reversibly changes its color. Preferably, the HEV light absorbing compounds for use in the invention are static compounds.

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

As noted above, the invention provides a contact lens, including a silicone hydrogel contact lens, that is a free radical reaction product of a reactive mixture that includes an HEV light absorbing compound and a polyamide internal wetting agent. The contact lens exhibits certain, desirable, light transmission properties.

For instance, a contact lens of the invention may transmit from 0 percent to 70 percent, or from 0.2 to 70 percent, or from 1 to 70 percent, of light across a wavelength range of 400 to 409 nm. The transmission of the contact lens across the 400 to 409 nm wavelength range may be at least 2 percent, or at least 3 percent, or at least 4 percent. The transmission of the contact lens across the 400 to 409 nm range may be up to 60 percent, or up to 50 percent, or up to 40 percent, or up to 30 percent, or up 20 percent.

The contact lens may transmit 10 percent or less of light across a wavelength range of 200 to 279 nm. The transmission of the contact lens across the 200 to 279 nm wavelength range may be 5 percent or less or 1 percent or less, or less than 1 percent.

The contact lens may transmit 45 percent or less of light across a wavelength range of 280 to 399 nm. The transmission of the contact lens across the 280 to 399 nm wavelength range may be 35 percent or less, or 25 percent or less, or 20 percent or less, or 10 percent or less, or 5 percent or less, or 1 percent or less.

The contact lens may transmit at least 10 percent of light across a wavelength range of 410 to 424 nm. The transmission of the contact lens across the 410 to 424 nm wavelength range may be at least 15 percent. The transmission of the contact lens across the 410 to 424 nm wavelength range may be up to 95 percent, up to 85 percent, up to 75 percent, or up 65 percent.

The contact lens may transmit at least 50 percent of light across a wavelength range of 425 to 449 nm. The transmission of the contact lens across the 425 to 449 nm range may be at least 60 percent.

The contact lens may transmit at least 80 percent of light across a wavelength range of 450 to 800 nm. The transmission of the contact lens across the 450 to 800 nm wavelength range may be at least 85 percent.

The contact lens may transmit from 0 to 70 percent or from 0.2 to 70 percent, or from 1 to 70 percent of light across a wavelength range of 400 to 409 nm; and 45 percent or less of light across a wavelength range of 280 to 399 nm.

The contact lens may transmit from 0 to 70 percent or from 0.2 to 70 percent, or from 1 to 70 percent of light across a wavelength range of 400 to 409 nm; 45 percent or less of light across a wavelength range of 280 to 399 nm; and at least 80 percent of light across a wavelength range of 450 to 800 nm.

The contact lens may transmit from 0 to 70 percent or from 0.2 to 70 percent, or from 1 to 70 percent of light across a wavelength range of 400 to 409 nm; 45 percent or less of light across a wavelength range of 280 to 399 nm; from 10 to 95 percent of light across a wavelength range of 410 to 424 nm; at least 50 percent of light across a wavelength range of 425 to 449 nm; and at least 80 percent of light across a wavelength range of 450 to 800 nm.

In addition to exhibiting desirable light transmission properties, the contact lenses of the invention, including the silicone hydrogel contact lenses, also exhibit desirably low pervaporation rates. As noted above, lower pervaporation rates may reduce moisture loss from the eye.

As shown by the Examples below, it has been discovered that contact lenses containing a polyamide internal wetting agent, such as PVP, generally exhibit a lower pervaporation rate than other lens types. A further discovery, however, is that lenses that contain an HEV light absorbing compound, in addition to a polyamide internal wetting agent, exhibit even lower pervaporation rates than lenses containing the same amount of polyamide wetting agent but no HEV light filtering compound. Without wishing to be bound by theory, it is believed that the presence of an HEV light absorbing compound in a reactive mixture that also contains a polyamide internal wetting agent results in a distribution of the polyamide internal wetting agent in the lens that is favorable for reducing pervaporation rate. This may be because the HEV light absorbing compound impacts the polymerization process. For instance where the polymerization is initiated with a visible light photoinitiator, the HEV light absorbing compound may absorb some of the visible light that would otherwise activate the photoinitiator, thus affecting the polymerization and consequent morphology of the lens.

Since polyamides such as PVP are hydrophilic and therefore are attracted to water, the optimized distribution of the wetting agent is believed to manifest as less evaporation of moisture through the lens and therefore reduced pervaporation rates.

The lenses of the invention provide favorably low pervaporation rates across a wide range of relative humidities. For instance, at about 0 percent relative humidity, a contact lens of the invention, when measured on a −1 diopter lens, may exhibit a pervaporation rate of less than 0.47 uL/min*cm$^2$, alternatively less than 0.45 uL/min*cm$^2$, or alternatively less than 0.41 uL/min*cm$^2$. The pervaporation rate at about 0 percent relative humidity may be 0.40 uL/min*cm$^2$ or less.

At a relative humidity of about 30 percent, a contact lens of the invention, when measured on a −1 diopter lens, may exhibit a pervaporation rate of less than 0.43 uL/min*cm$^2$, or less than 0.41 uL/min*cm$^2$, or less than 0.38 uL/min*cm$^2$. The pervaporation rate at about 30 percent relative humidity may be 0.37 uL/min*cm$^2$ or less.

At a relative humidity of about 50 percent, a contact lens of the invention, when measured on a −1 diopter lens, may exhibit a pervaporation rate of less than 0.38 uL/min*cm$^2$, or less than 0.36 uL/min*cm$^2$. The pervaporation rate at about 50 percent relative humidity may be 0.34 uL/min*cm$^2$ or less.

At a relative humidity of about 80 percent, a contact lens of the invention, when measured on a −1 diopter lens, may exhibit a pervaporation rate of less than 0.20 uL/min*cm$^2$, or less than 0.19 uL/min*cm$^2$. The pervaporation rate at about 80 percent relative humidity may be 0.18 uL/min*cm$^2$ or less.

The contact lens of the invention may be a soft hydrogel contact lens, preferably a silicone hydrogel contact lens. The transmission wavelengths and percentages discussed above may be measured on various thicknesses of lenses. For example, the center thickness may be from 70 to 300 microns, or from 80 to 230 microns, or from 80 to 110 microns, or from 90 to 110 microns. The concentration of the HEV light absorbing compounds may be adjusted to achieve the foregoing transmission properties. For instance, the concentration may be in the range of at least 0.01 percent, or at least 0.1 percent, or at least 1 percent, or at least 2 percent; and up to 10 percent or up to 5 percent, based on the weight percentages of all components in the reactive mixture, excluding diluent. A typical concentration may be in the range of 0.2 to 5 percent.

The HEV light absorbing compound for use in the contact lenses of the invention may be a compound of formula I:

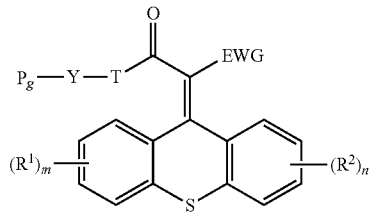

Formula I wherein:
m and n are independently 0, 1, 2, 3, or 4;
T is a bond, O, or NR;
Y is a linking group;
P$_g$ is a polymerizable group;

R at each occurrence is independently H, $C_1$-$C_6$ alkyl, cycloalkyl, heterocycloalkyl, aryl, heteroaryl, or Y—$P_g$; and $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring; and EWG is an electron withdrawing group, such as cyano, amide, ester, keto, or aldehyde (preferably cyano).

Compounds of formula I preferably contain one or two Y—$P_g$ groups. More preferably, the compounds contain one Y—$P_g$ group.

Compounds of formula I may include compounds of formula I-1, which are compounds of formula I wherein m and n are independently 0 or 1, or alternatively both are 0.

Compounds of formulae I and I-1 may include compounds of formula I-2, which are compounds of formula I, or I-1 wherein m is 1 and $R^1$ is $C_1$-$C_6$ alkyl, preferably ethyl or methyl.

Compounds of formulae I, I-1, and I-2 may include compounds of formula I-3, which are compounds of formula I, I-1, or I-2 wherein n is 1 and $R^2$ is $C_1$-$C_6$ alkyl, preferably ethyl or methyl.

Compounds of formulae I, I-1, I-2, and I-3 may include compounds of formula I-4, which are compounds of formula I, I-1, I-2, or I-3 wherein R is H, or $C_1$-$C_6$ alkyl. Preferably, R in the group T is H.

Compounds of formulae I, I-1, I-2, I-3, and I-4 may include compounds of formula I-5, which are compounds of formula I, I-1, I-2, I-3, or I-4 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making contact lenses. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

Compounds of formulae I, I-1, I-2, I-3, I-4, and I-5 may include compounds of formula I-6, which are compounds of formula I, I-1, I-2, I-3, I-4, or I-5 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—). When T in the compound of formula I is O, it is preferred that the carbon atom of the linking group to which the O is attached be hindered. For instance, if T is O and Y is alkylene, a preferred alkylene is —$C(R^H)_2(CH_2)_x$—, where $R^H$ is independently $C_1$-$C_6$ alkyl (preferably independently methyl or ethyl) and x is from 1 to 5.

Compounds of formulae I, I-1, I-2, I-3, I-4, I-5, and I-6 may include compounds of formula I-7, which are compounds of formula I, I-1, I-2, I-3, I-4, I-5, or I-6 wherein T is a bond or is NR (preferably NH).

Compounds of formula I may include compounds of formula II:

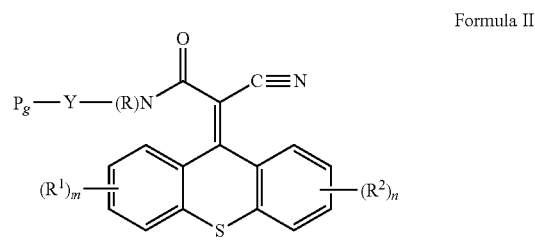

Formula II wherein:
m and n are independently 0, 1, 2, 3, or 4;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$; and
$R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

Compounds of formula II preferably contain one or two Y—$P_g$ groups. More preferably, the compounds contain one Y—$P_g$ group.

Compounds of formulae II may include compounds of formula II-1, which are compounds of formula II wherein m and n are independently 0 or 1, or alternatively both are 0.

Compounds of formulae II, and II-1 may include compounds of formula II-2, which are compounds of formula II, or II-1 wherein m is 1 and $R^1$ is $C_1$-$C_6$ alkyl, preferably ethyl or methyl.

Compounds of formulae II, II-1, and II-2 may include compounds of formula II-3, which are compounds of formula II, II-1, or II-2 wherein n is 1 and $R^2$ is $C_1$-$C_6$ alkyl, preferably ethyl or methyl.

Compounds of formulae II, II-1, II-2, and II-3 may include compounds of formula II-4, which are compounds of formula II, II-1, II-2, or II-3 wherein R at each occurrence is independently H, or $C_1$-$C_6$ alkyl. Preferably, R at each occurrence is H. Preferably R in the group T is H.

Compounds of formulae II, II-1, II-2, II-3, and II-4 may include compounds of formula II-5, which are compounds of formula II, II-1, II-2, II-3, or II-4 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

Compounds of formulae II, II-1, II-2, II-3, II-4, and II-5 may include compounds of formula II-6, which are compounds of formula II, II-1, II-2, II-3, II-4, or II-5 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—).

Specific examples of compounds of formula I include, but are not limited to, the compounds shown in Table A.

TABLE A

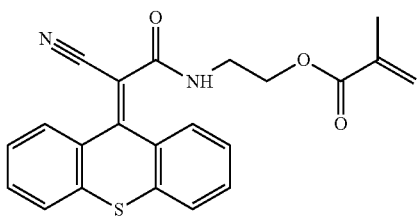

2-(2-cyano-2-(9H-thioxanthen-9-ylidene)acetamido)ethyl methacrylate

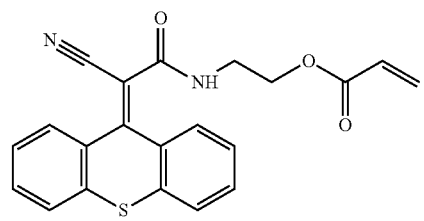

2-(2-cyano-2-(9H-thioxanthen-9-ylidene)acetamido)ethyl acrylate

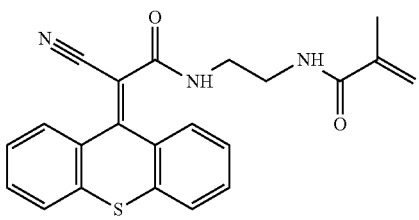

N-(2-(2-cyano-2-(9H-thioxanthen-9-ylidene)acetamido)ethyl)methacrylamide

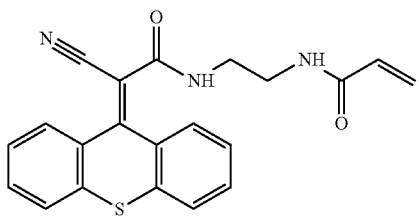

N-(2-(2-cyano-2-(9H-thioxanthen-9-ylidene)acetamido)ethyl)acrylamide

TABLE A-continued

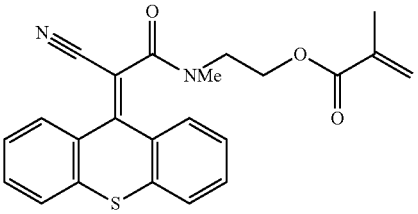

2-(2-cyano-N-methyl-2-(9H-thioxanthen-9-ylidene)acetamido)ethyl methacrylate

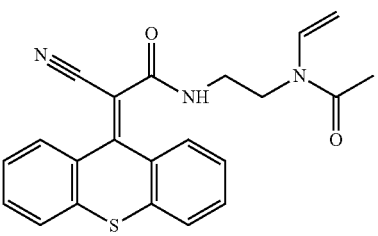

2-cyano-2-(9H-thioxanthen-9-ylidene)-N-(2-(N-vinylacetamido)ethyl)acetamide

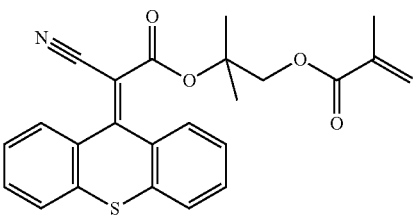

2-(2-cyano-2-(9H-thioxanthen-9-ylidene)acetamido)-2-methylpropyl methacrylate

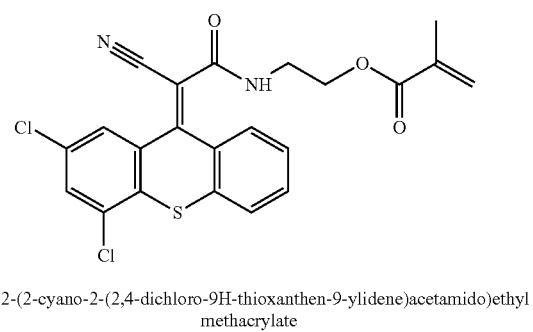

(E)-2-(2-cyano-2-(2,4-dichloro-9H-thioxanthen-9-ylidene)acetamido)ethyl methacrylate

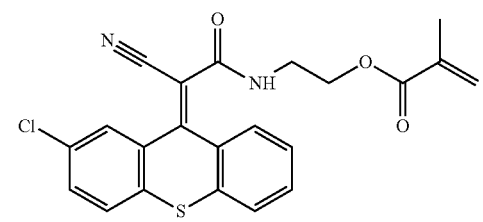

(E)-2-(2-(2-chloro-9H-thioxanthen-9-ylidene)-2-cyanoacetamido)ethyl methacrylate

TABLE A-continued

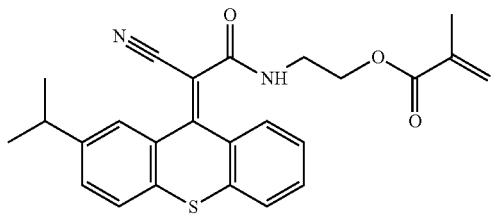

(E)-2-(2-cyano-2-(2-isopropyl-9H-thioxanthen-9-ylidene)acetamido)ethyl methacrylate

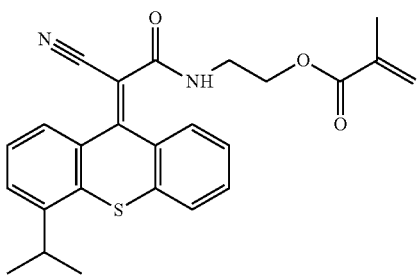

(E)-2-(2-cyano-2-(4-isopropyl-9H-thioxanthen-9-ylidene)acetamido)ethyl methacrylate

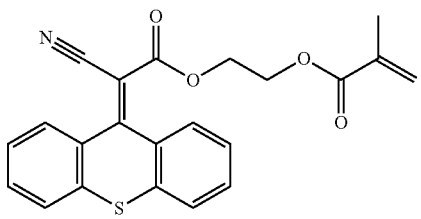

2-(2-cyano-2-(9H-thioxanthen-9-ylidene)acetoxy)ethyl methacrylate

HEV light absorbing compounds for use in the invention are preferably photostable. Thus, contact lenses of the invention, containing HEV light absorbing compounds, preferably exhibit, relative to a control lens, 20% or less, alternatively 15% or less, alternatively 10% or less, alternatively 7% or less, alternatively 5% or less, or alternatively 2% or less of change in their average transmission over a wavelength range of 380 to 450 nm, following exposure under ICH Q1B conditions.

Contact lenses of the invention may comprise other light absorbing compounds, in addition to HEV light absorbing compounds, to provide desirable absorption characteristics. For example, preferred compositions may comprise an HEV light absorbing compound and a compound that absorbs UV. Suitable UV absorbing compounds are known in the art, and fall into several classes which include, but are not limited to, benzophenones, benzotriazoles, triazines, substituted acrylonitriles, salicyclic acid derivatives, benzoic acid derivatives, cinnamic acid derivatives, chalcone derivatives, dypnone derivatives, crotonic acid derivatives, or any mixtures thereof. A preferred class of UV absorbing compound is benzotriazoles, such as Norbloc (2-(2'-hydroxy-5-methacryloxyethylphenyl)-2H-benzotriazole).

A particularly preferred composition comprises 2-(2-cyano-2-(9H-thioxanthen-9-ylidene)acetamido)ethyl meth- acrylate and a UV absorbing compound, such as a benzotriazole, for instance (2-(2'-hydroxy-5-methacrylyloxyethylphenyl)-2H-benzotriazole).

Compounds of formula I may be prepared by those skilled in the art using literature methods. By way of example, various compounds of formula I may be prepared as shown in Scheme 1 and the associated description. Exemplary reagents and procedures for these reactions appear in the working examples.

Scheme 1

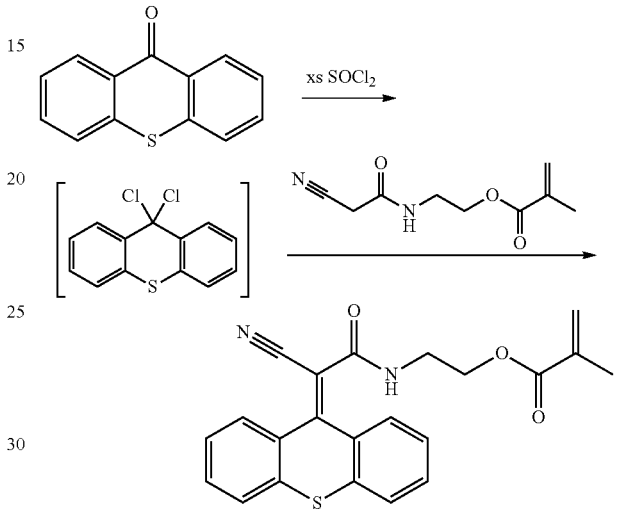

Scheme 1 shows a method for preparing exemplary compounds of the invention. Thus, the carbonyl moiety of the starting material is converted to a reactive dihalide intermediate, which is further reacted with the active methylene compound without further purification or isolation. The reaction mixture is protected from air and moisture until completion of the reaction with the cyanomethyl amide derivative. Other compounds of the invention may be prepared by those skilled in the art using analogous procedures to those shown in Scheme 1 with appropriate substitution of reagents.

High energy visible light absorbing compounds, such as the compounds of formula I, may be included in reactive mixtures to form contact lenses. Generally, the high energy visible light absorbing compounds can be present in any amount, typically up to the limit of their solubility. For instance, the compounds may be present in an amount in the range of about 0.1% to about 10% by weight, or from about 0.5 to about 5% by weight, or from about 0.75% to about 4% by weight. The upper limit is typically determined by the solubility of the compound with other co-monomers and or diluents in the reactive monomer mix.

A variety of contact lenses may be prepared, including hard contact lenses and soft contact lenses. Preferably, the contact lens is a soft contact lens, which may be made from conventional or silicone hydrogel formulations. The contact lens may be a toric contact lens, such as a toric hydrogel contact lens or a toric silicone hydrogel contact lens. Such lenses may be used to correct astigmatism in wearers needing astigmatism correction. The contact lens may also be a multifocal contact lens. Such lenses may be used to correct presbyopia in wearers needing presbyopia correction.

Contact lenses of the invention comprise a free radical reaction product of a reactive mixture containing one or more HEV light absorbing compounds, such as compounds of formula I, one or more monomers suitable for making the desired ophthalmic device (also referred to herein as device forming monomers or hydrogel forming monomers), and optional components. Thus, the reactive mixture may, for example, include, in addition to a high energy visible light absorbing compound as described above, one or more of: hydrophilic components, hydrophobic components, silicone-containing components, wetting agents such as polyamides, crosslinking agents, and further components such as diluents and initiators.

Hydrophilic Components

Examples of suitable families of hydrophilic monomers include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, 2-aminoethyl (meth)acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth)acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl) dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-Containing Components

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

Formula A. The silicone-containing component may comprise one or more polymerizable compounds of Formula A:

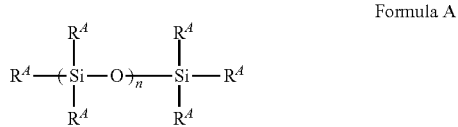

Formula A wherein:

at least one $R^A$ is a group of formula $R_g$-L- wherein $R_g$ is a polymerizable group and L is a linking group, and the remaining $R^A$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table B. Where the compounds in Table B contain polysiloxane groups, the number of SiO repeat units in such compounds, unless otherwise indicated, is preferably from 3 to 100, more preferably from 3 to 40, or still more preferably from 3 to 20.

TABLE B

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SiMAA) |
| 16 | 2-hydroxy-3-methacryloxypropyloxypropyl-tris(trimethylsiloxy)silane |

TABLE B-continued
17 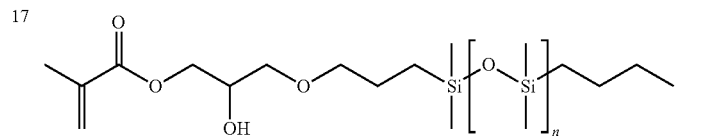
mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units)
18 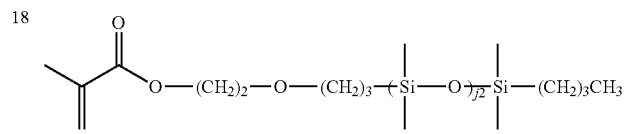
19 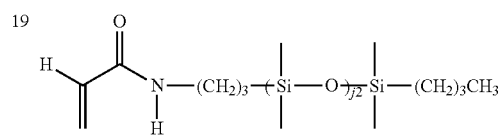
20 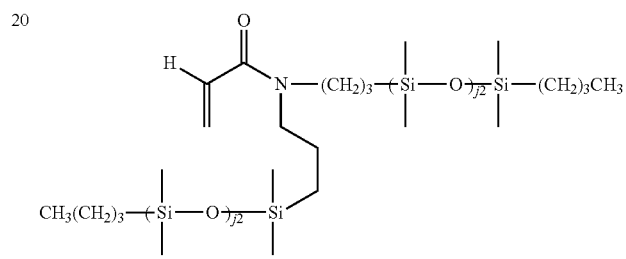
21 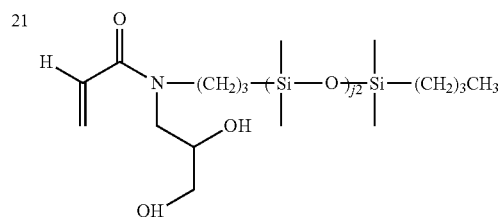
22 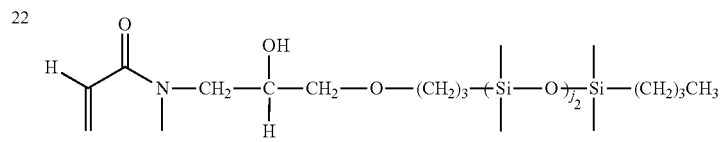
23 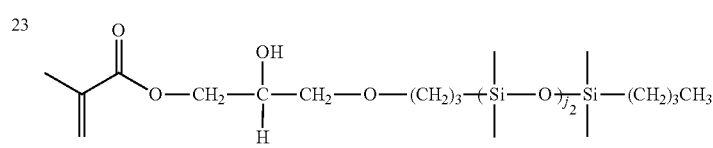
24 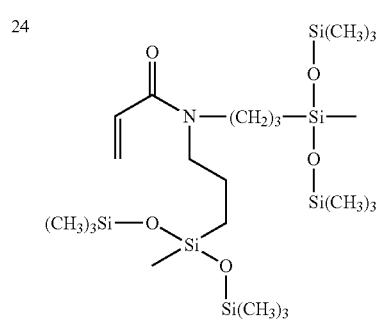

Additional non-limiting examples of suitable silicone-containing components are listed in Table C. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE C

25 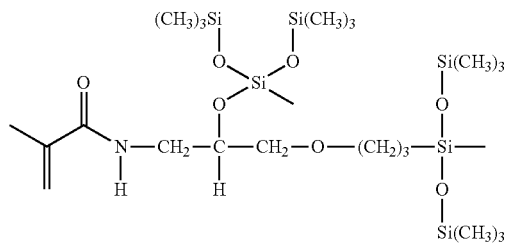

26 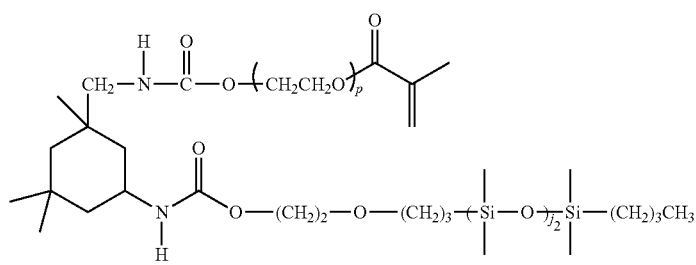

p is 1 to 10

27 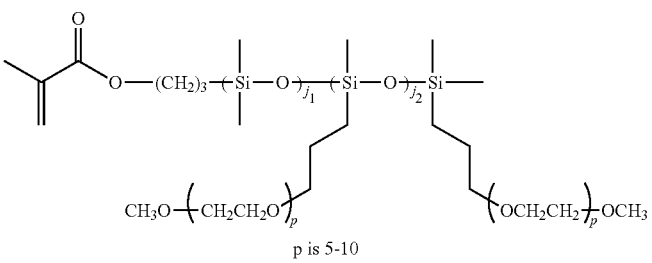

p is 5-10

28 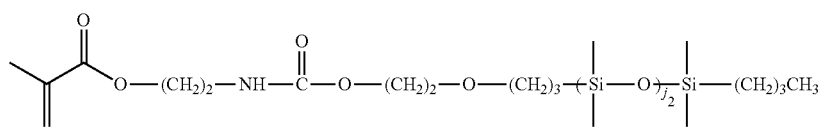

29 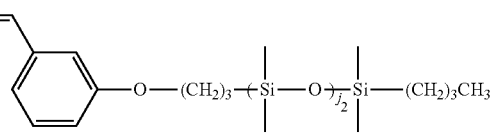

30 1,3-bis[4-(vinyloxycarbonyloxy)but-1-yl]tetramethyl-disiloxane
31 3-(vinyloxycarbonylthio)propyl-[tris(trimethylsiloxy)silane]
32 3-[tris(trimethylsiloxy)silyl]propyl allyl carbamate
33 3-[tris(trimethylsiloxy)silyl]propyl vinyl carbamate
34 tris(trimethylsiloxy)silylstyrene (Styryl-TRIS)

TABLE C-continued

35 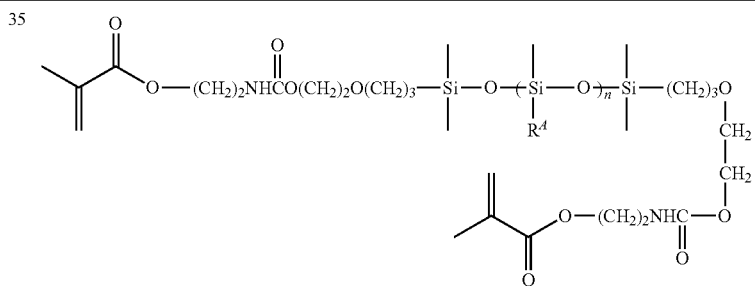

$R^A = CH_3(a)$ or $CH_2CH_2CF_3(b)$ or $CH_2-(CH_2)_2-[OCH_2CH_2]_{1-10}-OCH_3(c)$;
$a + b + c = n$

36 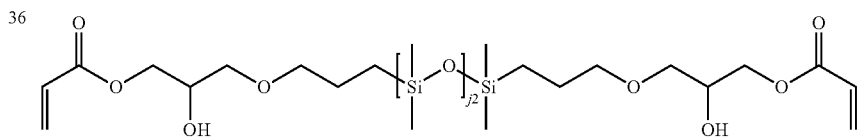

37 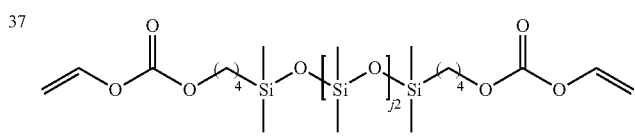

38 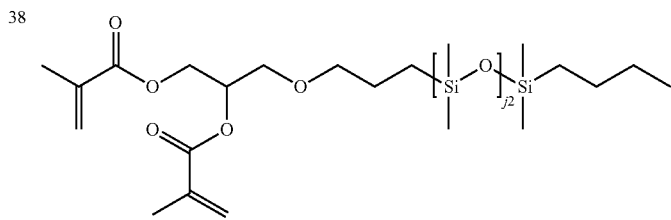

39 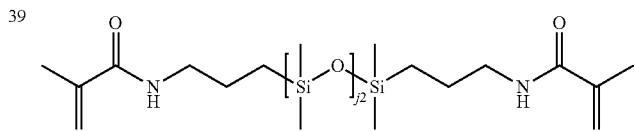

40 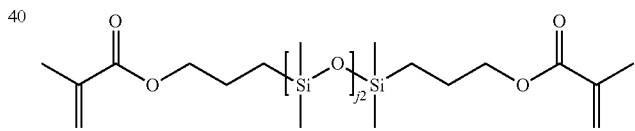

41 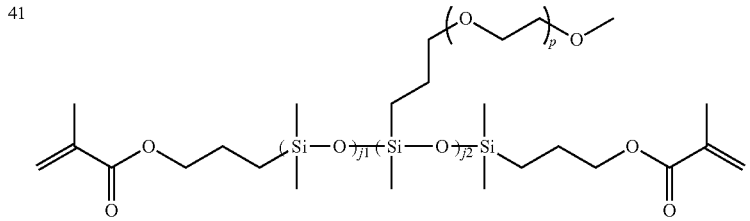

$j1 = 80-90$
$j2 = 5-6$
$p = 7-8$

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

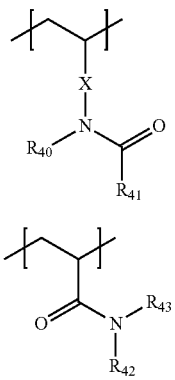

Formula G1

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted C$_1$ to C$_2$ alkyl groups. X may be a direct bond, and R$_{40}$ and R$_{41}$ may be independently selected from H, substituted or unsubstituted C$_1$ to C$_2$ alkyl groups. R$_{42}$ and R$_{43}$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methyl-propionamide, N-vinyl-2-methyl-propionamide, N-vinyl-N, N'-dimethylurea, N,N-dimethylacrylamide, methacrylamide, and acyclic amides of Formulae G2 and G3:

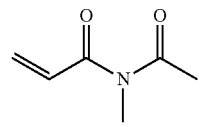

Formula G2

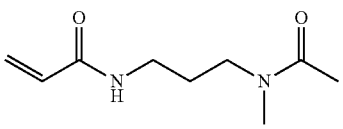

Formula G3

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

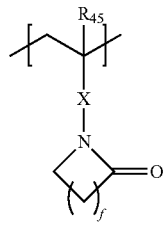

Formula G4 wherein R$_{45}$ is a hydrogen atom or methyl group; wherein f is a number from 1 to 10; wherein X is a direct bond, —(CO)—, or —(CONHR$_{46}$)—, wherein R$_{46}$ is a C$_1$ to C$_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth) acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N, N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a $M_w$ of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons; greater than about 150,000; between about 150,000 to about 2,000,000 daltons; between about 300,000 to about 1,800,000 daltons. Higher molecular weight polyamides may be used if they are compatible with the reactive monomer mixture.

Reactive mixtures of the invention preferably include up to eleven weight percent of a polyamide internal wetting agent, alternatively less than 11 weight percent, alternatively 9 weight percent or less, alternatively less than 9 weight percent, alternatively 8 weight percent or less, or alternatively 7 weight percent or less, of a polyamide internal wetting agent. Preferably, the polyamide internal wetting agent is a high molecular weight (weight average molecular weight of at least 100,000 daltons) polyvinylpyrrolidone (PVP) homopolymer.

Cross-Linking Agents

It is generally desirable to add one or more cross-linking agents, also referred to as cross-linking monomers, multifunctional macromers, and prepolymers, to the reactive mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end-capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described above, such as compounds of Formula E (and its sub-formulae) and the multi-functional compounds shown in Table C.

Further Constituents

The reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, nonpolymerizable dyes, release agents, and combinations thereof.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy)
methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylbenzyldiphenyl phosphine oxide and 2,4,6-trimethylbenzoyl diphenylphosphine oxide, benzoin methyl ester and a combination of cam-phorquinone and ethyl 4-(N,N-dimethylamino)benzoate.

Commercially available (from IGM Resins B.V., The Netherlands) visible light initiator systems include Irgacure® 819, Irgacure® 1700, Irgacure® 1800, Irgacure® 819, Irgacure® 1850 and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO).

The reactive mixture for making the contact lenses of the invention may comprise, in addition to a high energy visible light absorbing compound, any of the polymerizable compounds and optional components described above.

Preferred reactive mixtures may comprise: a high energy visible light absorbing compound, such as a formula I compound, and a hydrophilic component.

Preferred reactive mixtures may comprise: a high energy visible light absorbing compound, such as a formula I compound, and a hydrophilic component selected from DMA, NVP, HEMA, VMA, NVA, methacrylic acid, and mixtures thereof. Preferred are mixtures of HEMA and methacrylic acid.

Preferred reactive mixtures may comprise: a high energy visible light absorbing compound, such as a formula I compound, a hydrophilic component, and a silicone-containing component.

Preferred reactive mixtures may comprise: a high energy visible light absorbing compound, such as a formula I compound, a hydrophilic component, and a silicone-containing component comprising a compound of formula A.

Preferred reactive mixtures may comprise: a high energy visible light absorbing compound, such as a formula I compound, a hydrophilic component selected from DMA, NVP, HEMA, VMA, NVA, and mixtures thereof; a silicone-containing component such as a compound of formula A; and an internal wetting agent.

Preferred reactive mixtures may comprise: a high energy visible light absorbing compound, such as a formula I compound, a hydrophilic component selected from DMA, HEMA and mixtures thereof; a silicone-containing component selected from 2-hydroxy-3-[3-methyl-3,3-di(trimethylsiloxy)silylpropoxy]-propyl methacrylate (SiMAA), monomethacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof; and a wetting agent (preferably PVP or PVMA). For the hydrophilic component, mixtures of DMA and HEMA are preferred. For the silicone containing component, mixtures of SiMAA and mPDMS are preferred.

Preferred reactive mixtures may comprise: a high energy visible light absorbing compound, such as a formula I compound, a hydrophilic component comprising a mixture of DMA and HEMA; a silicone-containing component comprising a mixture of OH-mPDMS having from 2 to 20 repeat units (preferably a mixture of 4 and 15 repeat units). Preferably, the reactive mixture further comprises a silicone-containing crosslinker, such as ac-PDMS. Also preferably, the reactive mixture contains a wetting agent (preferably DMA, PVP, PVMA or mixtures thereof).

Preferred reactive mixtures may comprise: a high energy visible light absorbing compound, such as a formula I compound; between about 1 and about 15 wt % of at least one polyamide (e.g., an acyclic polyamide, a cyclic polyamide, or mixtures thereof); at least one first mono-functional, hydroxyl substituted poly(disubstituted siloxane) having 4 to 8 siloxane repeating units (e.g., OH-mPDMS where n is 4 to 8, preferably n is 4); at least one second hydroxyl substituted poly(disubstituted siloxane) that is a mono-functional hydroxyl substituted poly(disubstituted siloxane)s having 10 to 200 or 10-100 or 10-50 or 10-20 siloxane repeating units (e.g., OH-mPDMS where n is 10 to 200 or 10-100 or 10-50 or 10-20, preferably n is 15); about 5 to about 35 wt % of at least one hydrophilic monomer; and optionally a multifunctional hydroxyl substituted poly(disubstituted siloxane)s having 10 to 200, or 10 to 100 siloxane repeating units (e.g., ac-PDMS). Preferably, the first monofunctional, hydroxyl substituted poly(disubstituted siloxane) and the second hydroxyl substituted poly(disubstituted siloxane) are present in concentrations to provide a ratio of weight percent of the first mono-functional, hydroxyl substituted poly(disubstituted siloxane) to weight percent of the second hydroxyl substituted poly(disubstituted siloxane) of 0.4-1.3, or 0.4-1.0.

The foregoing reactive mixtures may contain optional ingredients such as, but not limited to, one or more initiators, internal wetting agents, crosslinkers, other UV or HEV absorbers, and diluents.

Curing of Hydrogels and Manufacture of Lens

The reactive mixtures may be formed by any of the methods known in the art, such as shaking or stirring, and used to form polymeric articles or devices by known methods. The reactive components are mixed together either with or without a diluent to form the reactive mixture.

For example, ophthalmic devices may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded ophthalmic device, such as a silicone hydrogel contact lens, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens.

The reactive mixture may be cured via any known process for molding the reactive mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the silicone hydrogels, which is economical, and enables precise control over the final shape of the hydrated lens. For this method, the reactive mixture is placed in a mold having the shape of the final desired silicone hydrogel and the reactive mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

As indicated above, preferred ophthalmic devices are contact lenses, more preferably soft hydrogel contact lenses. The transmission wavelengths and percentages described herein may be measured on various thicknesses of lenses using, for instance, the methodologies described in the Examples. By way of example, a preferred center thickness for measuring transmission spectra in a soft contact lens may be from 80 to 100 microns, or from 90 to 100 microns or from 90 to 95 microns. Typically, the measurement may be made at the center of the lens using, for instance, a 4 nm instrument slit width. Various concentrations of the one or more high energy visible light absorbing compounds may be used to achieve the transmission characteristics described above. For instance, the concentration may be in the range of at least 1 percent, or at least 2 percent; and up to 10 percent, or up to 5 percent, based on the weight percentages of all components in the reactive mixture, excluding diluent. A typical concentration may be in the range of 3 to 5 percent.

Silicone hydrogel ophthalmic devices (e.g., contact lenses) according to the invention preferably exhibit the following properties. All values are prefaced by "about," and the devices may have any combination of the listed properties. The properties may be determined by methods known to those skilled in the art, for instance as described in United States pre-grant publication US20180037690, which is incorporated herein by reference.

Water concentration %: at least 20%, or at least 25% and up to 80% or up to 70%
Haze: 30% or less, or 10% or less
Advancing dynamic contact angle (Wilhelmy plate method): 100° or less, or 80° or less; or 50° or less
Tensile Modulus (psi): 150 or less, or 135 or less, 120 or less, or 80 to 135
Oxygen permeability (Dk, barrers): at least 60 barrers, or at least 80, or at least 100, or at least 150, or at least 200
Elongation to Break: at least 100

For ionic silicon hydrogels, the following properties may also be preferred (in addition to those recited above):
Lysozyme uptake (μg/lens): at least 100, or at least 150, or at least 500, or at least 700
Polyquaternium 1 (PQ1) uptake (%): 15 or less, or 10 or less, or 5 or less.

Contact lenses of the invention may be used to improve one or more vision attributes in a contact lens wearer. The vision attribute may be photostress recovery time. The vision attribute may be glare discomfort. The vision attribute may be glare disability threshold. The vision attribute may be heterochromatic contrast threshold. The vision attribute may be halo size. The vision attribute may be starburst size. The vision attribute may be light scattering. The vision attribute may be one or more of photostress recovery time, glare discomfort, glare disability threshold, heterochromatic contrast threshold, halo size, starburst size, and light scattering. Further details regarding improvements in visual attributes are provided in the Examples below.

The following clauses list non-limiting embodiments of the disclosure.

1. A contact lens that is a free radical reaction product of a reactive mixture comprising: one or more monomers suitable for making the contact lens; an HEV light absorbing compound; and up to eleven weight percent of a polyamide internal wetting agent (preferably high molecular weight polyvinylpyrrolidone homopolymer), wherein the contact lens transmits from 0 percent to 70 percent of light having a wavelength range of 400 to 409 nm, and wherein the contact lens exhibits a pervaporation rate, when measured at a relative humidity of about 0 percent, of less than 0.47 uL/min*cm$^2$, or less than 0.45 uL/min*cm$^2$, or less than 0.41 uL/min*cm$^2$.

2. A contact lens that is a free radical reaction product of a reactive mixture comprising: one or more monomers suitable for making the contact lens; an HEV light absorbing compound; and up to eleven weight percent of a polyamide internal wetting agent (preferably high molecular weight polyvinylpyrrolidone homopolymer), wherein the contact lens transmits from 0 percent to 70 percent of light having a wavelength range of 400 to 409 nm, and wherein the contact lens exhibits a pervaporation rate, when measured at a relative humidity of about 30 percent, of less than 0.43 uL/min*cm$^2$, or less than 0.41 uL/min*cm$^2$, or less than 0.38 uL/min*cm$^2$.

3. A contact lens that is a free radical reaction product of a reactive mixture comprising: one or more monomers suitable for making the contact lens; an HEV light absorbing compound; and up to eleven weight percent of a polyamide internal wetting agent (preferably high molecular weight polyvinylpyrrolidone homopolymer), wherein the contact lens transmits from 0 percent to 70 percent of light having a wavelength range of 400 to 409 nm, and wherein the contact lens exhibits a pervaporation rate, when measured at a relative humidity of about 50 percent, of less than 0.38 uL/min*cm$^2$, or less than 0.36 uL/min*cm$^2$, or 0.34 uL/min*cm$^2$ or less.

4. A contact lens that is a free radical reaction product of a reactive mixture comprising: one or more monomers suitable for making the contact lens; an HEV light absorbing compound; and up to eleven weight percent of a polyamide internal wetting agent (preferably high molecular weight polyvinylpyrrolidone homopolymer), wherein the contact lens transmits from 0 percent to 70 percent of light having a wavelength range of 400 to 409 nm, and wherein the contact lens exhibits a pervaporation rate, when measured at a relative humidity of about 80 percent, of less than 0.20 uL/min*cm$^2$, or less than 0.19 uL/min*cm$^2$, or 0.18 uL/min*cm$^2$ or less.

5. The contact lens of any one of clauses 1 to 4 wherein the reactive mixture contains less than nine weight percent of the polyamide internal wetting agent.

6. The contact lens of any one of clauses 1 to 5 that transmits from 0.2 percent to 70 percent of light having a wavelength range of 400 to 409 nm 7. The contact lens of any one of clauses 1 to 6 that transmits from 1 percent to 70 percent of light having a wavelength range of 400 to 409 nm 8. The contact lens of any one of clauses 1 to 7 that transmits 45 percent or less of light having a wavelength range of 280 to 399 nm.

9. The contact lens of any one of clauses 1 to 8 that transmits at least 80 percent of light having a wavelength range of 450 to 800 nm.

10. The contact lens of any one of clauses 1 to 9 that transmits: 45 percent or less of light having a wavelength range of 280 to 399 nm; from 1 percent to 70 percent of light having a wavelength range of 400 to 409 nm; and at least 80 percent of light having a wavelength range of 450 to 800 nm.

11. The contact lens of any one of clauses 1 to 10 that transmits: from 10 percent to 95 percent of light having a wavelength range of 410 to 424 nm; and at least 50 percent of light having a wavelength range of 425 to 449 nm.

12. The contact lens of any one of clauses 1 to 11 that transmits: 20 percent or less of light having a wavelength range of 280 to 399 nm; from 3 percent to 70 percent of light having a wavelength range of 400 to 409 nm; and at least 85 percent of light having a wavelength range of 450 to 800 nm.

13. The contact lens of any one of clauses 1 to 12 wherein the monomer suitable for making the ophthalmic device comprises a hydrophilic component, a silicone-containing component, or mixtures thereof.

14. A silicone hydrogel contact lens that is a reaction product of a reactive mixture comprising: a polymerizable high energy light absorbing compound; one or more monomers suitable for making the silicone hydrogel contact lens; and less than eleven weight percent of high molecular weight polyvinylpyrrolidone homopolymer, wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 0 percent, of less than 0.47 uL/min*cm², or less than 0.45 uL/min*cm², or less than 0.41 uL/min*cm².

15. A silicone hydrogel contact lens that is a reaction product of a reactive mixture comprising: a polymerizable high energy light absorbing compound; one or more monomers suitable for making the silicone hydrogel contact lens; and up to eleven weight percent of a polyamide internal wetting agent (preferably high molecular weight polyvinylpyrrolidone homopolymer), wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 30 percent, of less than 0.43 uL/min*cm², or less than 0.41 uL/min*cm², or less than 0.38 uL/min*cm².

16. A silicone hydrogel contact lens that is a reaction product of a reactive mixture comprising: a polymerizable high energy light absorbing compound; one or more monomers suitable for making the silicone hydrogel contact lens; and up to eleven weight percent of a polyamide internal wetting agent (preferably high molecular weight polyvinylpyrrolidone homopolymer), wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 50 percent, of less than 0.38 uL/min*cm², or less than 0.36 uL/min*cm², or 0.34 uL/min*cm² or less.

17. A silicone hydrogel contact lens that is a reaction product of a reactive mixture comprising: a polymerizable high energy light absorbing compound; one or more monomers suitable for making the silicone hydrogel contact lens; and up to eleven weight percent of a polyamide internal wetting agent (preferably high molecular weight polyvinylpyrrolidone homopolymer), wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 80 percent, of less than 0.20 uL/min*cm², or less than 0.19 uL/min*cm², or 0.18 uL/min*cm² or less.

18. The silicone hydrogel contact lens of any one of clauses 14 to 17 wherein the reactive mixture contains less than nine weight percent of the polyamide internal wetting agent.

19. The silicone hydrogel contact lens of any one of clauses 14 to 18 wherein the lens transmits: from 0 percent to 70 percent of light having a wavelength of 400 to 409 nm; and at least 80 percent of light having a wavelength of 450 to 800 nm.

20. The silicone hydrogel contact lens of any one of clauses 14 to 19 wherein the lens transmits: from 0.2 percent to 70 percent of light having a wavelength of 400 to 409 nm; and at least 80 percent of light having a wavelength of 450 to 800 nm.

21. The silicone hydrogel contact lens of any one of clauses 14 to 20 wherein the lens transmits: from 1 percent to 70 percent of light having a wavelength of 400 to 409 nm; and at least 80 percent of light having a wavelength of 450 to 800 nm.

22. A contact lens that is a free radical reaction product of a reactive mixture comprising: one or more monomers suitable for making the contact lens; and an HEV light absorbing compound, wherein the contact lens transmits from 0 percent to 70 percent of light having a wavelength range of 400 to 409 nm, and wherein the contact lens exhibits a pervaporation rate, when measured at a relative humidity of about 0 percent, of less than 0.47 uL/min*cm², or less than 0.45 uL/min*cm², or less than 0.41 uL/min*cm².

23. A contact lens that is a free radical reaction product of a reactive mixture comprising: one or more monomers suitable for making the contact lens; and an HEV light absorbing compound, wherein the contact lens transmits from 0 percent to 70 percent of light having a wavelength range of 400 to 409 nm, and wherein the contact lens exhibits a pervaporation rate, when measured at a relative humidity of about 30 percent, of less than 0.43 uL/min*cm², or less than 0.41 uL/min*cm², or less than 0.38 uL/min*cm².

24. A contact lens that is a free radical reaction product of a reactive mixture comprising: one or more monomers suitable for making the contact lens; and an HEV light absorbing compound, wherein the contact lens transmits from 0 percent to 70 percent of light having a wavelength range of 400 to 409 nm, and wherein the contact lens exhibits a pervaporation rate, at a relative humidity of about 50 percent, of less than 0.38 uL/min*cm², or less than 0.36 uL/min*cm², or 0.34 uL/min*cm² or less.

25. A contact lens that is a free radical reaction product of a reactive mixture comprising: one or more monomers suitable for making the contact lens; and an HEV light absorbing compound, wherein the contact lens transmits from 0 percent to 70 percent of light having a wavelength range of 400 to 409 nm, and wherein the contact lens exhibits a pervaporation rate, when measured at a relative humidity of about 80 percent, of less than 0.20 uL/min*$cm^2$, or less than 0.19 uL/min*$cm^2$, or 0.18 uL/min*$cm^2$ or less.

26. A silicone hydrogel contact lens that is a reaction product of a reactive mixture comprising: a polymerizable high energy light absorbing compound; and one or more monomers suitable for making the silicone hydrogel contact lens, wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 0 percent, of less than 0.47 uL/min*$cm^2$, or less than 0.45 uL/min*$cm^2$, or less than 0.41 uL/min*$cm^2$.

27. A silicone hydrogel contact lens that is a reaction product of a reactive mixture comprising: a polymerizable high energy light absorbing compound; and one or more monomers suitable for making the silicone hydrogel contact lens, wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 30 percent, of less than 0.43 uL/min*$cm^2$, or less than 0.41 uL/min*$cm^2$, or less than 0.38 uL/min*$cm^2$.

28. A silicone hydrogel contact lens that is a reaction product of a reactive mixture comprising: a polymerizable high energy light absorbing compound; and one or more monomers suitable for making the silicone hydrogel contact lens, wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 50 percent, of less than 0.38 uL/min*$cm^2$, or less than 0.36 uL/min*$cm^2$, or 0.34 uL/min*$cm^2$ or less.

29. A silicone hydrogel contact lens that is a reaction product of a reactive mixture comprising: a polymerizable high energy light absorbing compound; and one or more monomers suitable for making the silicone hydrogel contact lens, wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate, when measured at a relative humidity of about 80 percent, of less than 0.20 uL/min*$cm^2$, or less than 0.19 uL/min*$cm^2$, or 0.18 uL/min*$cm^2$ or less.

30. The contact lens or silicone hydrogel contact lens of any one of clauses 1 to 29 wherein the high energy light absorbing compound is a compound of formula I:

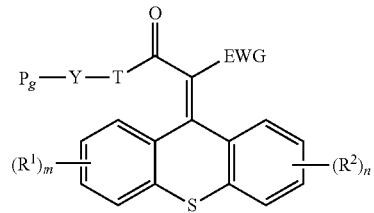

Formula I wherein m, n, T, Y, $P_g$, EWG, $R^1$, and $R^2$ are as defined above.

31. A method for improving a vision attribute in a contact lens wearer, the method comprising: providing the contact lens wearer with the contact lens or silicone hydrogel contact lens of any one of clauses 1 to 30, wherein the vision attribute is selected from one or more of photostress recovery time, glare discomfort, glare disability threshold, heterochromatic contrast threshold, halo size, starburst size, and light scattering.

EXAMPLES

Test Methods

The pervaporation rate of a contact lens was measured on a Surface Measurement Systems DVS Endeavor instrument. The Surface Measurement Systems DVS Endeavor is a dynamic vapor sorption (DVS) instrument. A key feature of DVS Endeavour is its ability to precisely control and measure temperature and relative humidity while simultaneously recording the high-resolution changes in mass on up to five samples.

Sample Preparation

Figure 13:
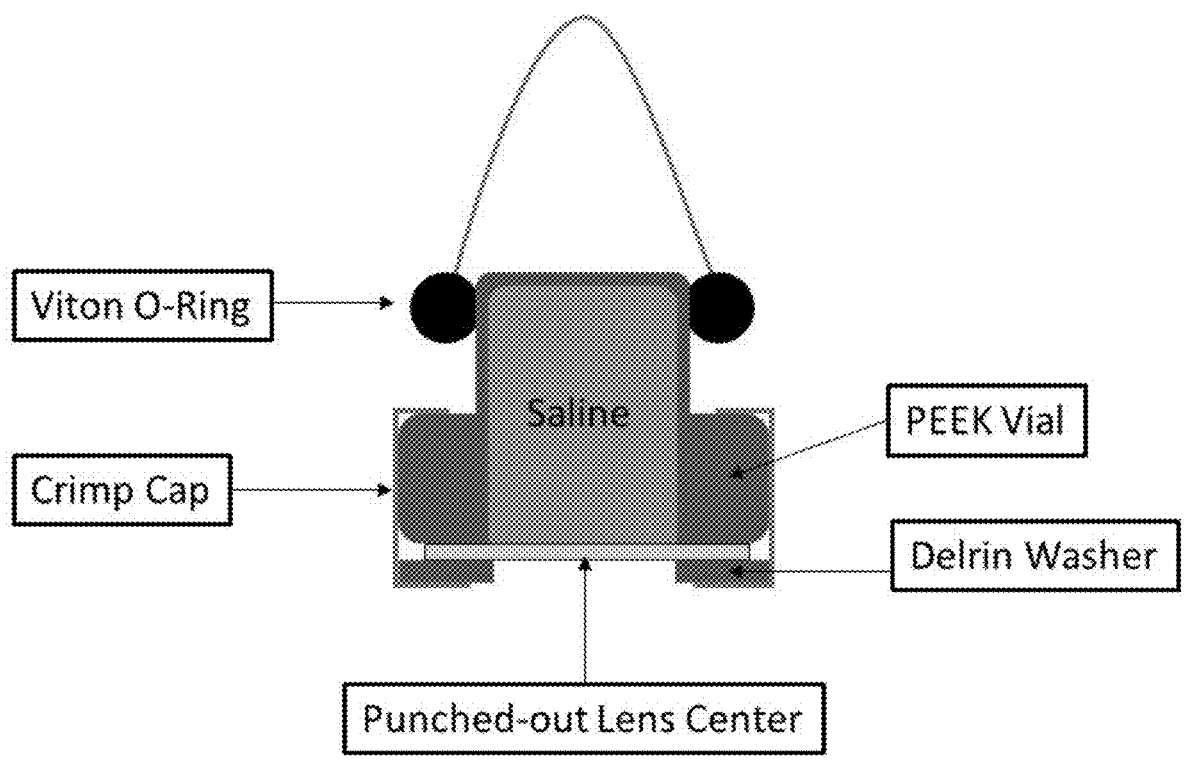
FIG. 13 shows a diagram of a pervaporation cell.
Figure 14:
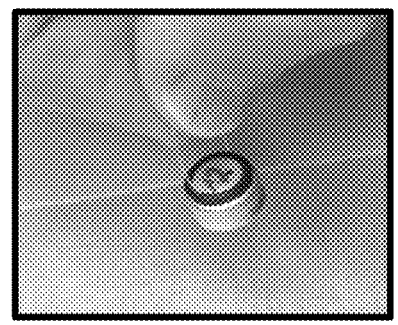
FIG. 14 shows a black and white photograph of an pervaporation cell.

Ninety microliters of Dulbecco's Phosphate Buffered Saline (PBS) which does not contain any calcium or magnesium ions were added to the pervaporation cell (PEEK vial, Sohacki Industries). Then, a lint free cloth (Baxter Spec Wipe 3, #1003-9 or equivalent) was prewetted with a small amount of PBS. A spherical contact lens (−1 diopter) was removed from its package and placed on the wetted area of the cloth with the front or anterior surface facing upward. Prewetting prevented the contact lens from sticking and keeps the surface of the lens from becoming dry. A swab and/or tweezers with soft plastic tips were used to handle the contact lens. The center of the contact lens was removed using an eight-millimeter biopsy punch. Thereafter, using plastic tweezers, gently place the punched-out sample onto the flange of the pervaporation cell with the front surface facing up. A Delrin washer (McMaster Carr Part #A95647A115, modified such that hole is 5.5 millimeters in diameter; area equaled 0.24 $cm^2$) and 11-millimeter crimp cap with a Teflon seal (Agilent Technologies p/n 5182-0871) were firmly placed on top of the punched-out sample and subsequently crimped using a crimping tool (Wheaton W225301). Finally, a Viton O-ring (1.5 millimeters thick×7 millimeters inner diameter McMaster Carr p/n 9263K293) was used to secure a loop of Nylon string to the backend of the pervaporation cell. The loop was used to hand the pervaporation cell from the microbalance in the DVS Endeavour. FIG. 13 shows a diagram of the pervaporation cell and FIG. 14 shows a black and white photograph of an actual pervaporation cell.

DVS Endeavor Instrument Settings

The DVS Endeavor was programed at 35° C., the gravimetric sampling interval was set at 5 seconds, and relative humidity (RH) profile had six segments: (1) 0% RH for 30 minutes, (2) 80% RH for 15 minutes, (3) 50% RH for 15 minutes, optionally (4) 40% RH for 15 minutes, (5) 30% RH for 15 minutes, and (6) 0% RH for 15 minutes. Segment 1 is an equilibration period, and segments 2-6 are used to record the pervaporation rate at different RH values.

Raw Data and Analysis

The DVS Endeavor measured the mass of the pervaporation cell as a function of time as the relative humidity changed in a stepwise fashion. The pervaporation cell lost water and as a result its mass decreased over time, depending on the relative humidity. The rate of water loss was higher at lower relative humidity. When the relative humidity setpoint was changed, the system took a few minutes to equilibrate. Once the system reached equilibrium, the rate of water loss became constant. A first derivative plot was then generated by plotting the slope at each time point of the mass versus time graph. For each time point, the slope was calculated from the 10 most adjacent time points. The final value for the pervaporation rate was calculated from the average slope over a 5-minute time window near the end of the humidity segment where the slope is relatively constant. The slope has units of milligrams per minute which is equivalent to microliters per minute (μL/min) when considering water loss (density=1 gram/mL). The lens area exposed in the pervaporation cell was 0.24 cm². As a result, the units of pervaporation rate are μL/min*cm². The final pervaporation rates are reported as the average of six individual lenses.

UV/Vis Spectra

Ultraviolet-visible spectra of compounds in solution were measured on a Perkin Elmer Lambda 45 or an Agilent Cary 6000i UV/VIS scanning spectrometer. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission or absorbance; and baseline correction was selected. For the Cary instrument, the scan range was 200-800 nm; the scan speed was 600 nm/min; the slit width was 2 nm; the mode was transmission or absorbance; and baseline correction was selected. A baseline correction was performed before samples were analyzed using the autozero function.

Ultraviolet-visible spectra of contact lenses formed in part from the claimed compositions were measured on a Perkin Elmer Lambda 45 UV/VIS or an Agilent Cary 6000i UV/VIS scanning spectrometer using packing solution. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission; and baseline correction was selected. Baseline correction was performed using cuvettes containing plastic two-piece lens holders and the same solvents. These two-piece contact lens holders were designed to hold the sample in the quartz cuvette in the location through which the incident light beam traverses. The reference cuvette also contained a two-piece holder. To ensure that the thickness of the samples is constant, all lenses were made using identical molds. The center thickness of the contact lens was measured using an electronic thickness gauge. Reported center thickness and percent transmission spectra are obtained by averaging three individual lens data.

It is important to ensure that the outside surfaces of the cuvette are completely clean and dry and that no air bubbles are present in the cuvette. Repeatability of the measurement is improved when the reference cuvette and its lens holder remain constant and when all samples use the same sample cuvette and its lens holder, making sure that both cuvettes are properly inserted into the instrument.

The following abbreviations will be used throughout the Examples and Figures and have the following meanings:
BC: back or base curve plastic mold
FC: front curve plastic mold
DMA: N,N-dimethylacrylamide (Jarchem)
HEMA: 2-hydroxyethyl methacrylate (Bimax)
PVP: poly(N-vinylpyrrolidone) (ISP Ashland)
PDMA: polydimethylacrylamide
PVMA: polyvinylmethyacetamide
EGDMA: ethylene glycol dimethacrylate (Esstech)
TEGDMA: tetraethylene glycol dimethacrylate (Esstech)
Irgacure 819: bis(2,4,6-trimethylbenzoyl)-phenylphosphineoxide (BASF or Ciba Specialty Chemicals)
Irgacure 1870: blend of bis(2,6-dimethoxybenzoyl)-2,4,4-trimethyl-pentylphosphineoxide and 1-hydroxy-cyclohexyl-phenyl-ketone (BASF or Ciba Specialty Chemicals)
mPDMS: mono-n-butyl terminated monomethacryloxypropyl terminated polydimethylsiloxane ($M_n$=800-1000 daltons) (Gelest)
HO-mPDMS: mono-n-butyl terminated mono-(2-hydroxy-3-methacryloxypropyloxy)-propyl terminated polydimethylsiloxane (Mn=400-1500 daltons) (Ortec or DSM-Polymer Technology Group)
ac-PDMS: bis-3-acryloxy-2-hydroxypropyloxypropyl polydimethylsiloxane (Tegomer V-Si 2250 from Evonik)
Blue HEMA: 1-amino-4-[3-(4-(2-methacryloyloxyethoxy)-6-chlorotriazin-2-ylamino)-4-sulfophenylamino]anthraquinone-2-sulfonic acid, as described in U.S. Pat. No. 5,944,853
Da: dalton or g/mole
kDa: kilodalton or an atomic mass unit equal to 1,000 daltons
SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate
RB247: 1,4-Bis[2-methacryloxyethylamino]-9,10-anthraquinone
BHT: -butylated hydroxytoluene
D3O: 3,7-dimethyl-3-octanol (Vigon)
DIW: deionized water
MeOH: methanol
IPA: isopropyl alcohol
HCl: hydrochloric acid
$CH_2Cl_2$ or DCM: methylene chloride or dichloromethane
$SOCl_2$: thionyl chloride
mCPBA: m-chloroperbenzoic acid
EtOAc: ethyl acetate
$NH_2CH_2CH_2OH$: ethanolamine or 2-aminoethanol
Norbloc: 2-(2'-hydroxy-5-methacrylyloxyethylphenyl)-2H-benzotriazole (Janssen)
PP: polypropylene which is the homopolymer of propylene TT: Tuftec which is a hydrogenated styrene butadiene block copolymer (Asahi Kasei Chemicals)
Z: Zeonor which is a polycycloolefin thermoplastic polymer (Nippon Zeon Co Ltd)
TL03 lights: Phillips TLK 40 W/03 bulbs
LED: light emitting diode
$^1$N NMR: proton nuclear magnetic resonance spectroscopy
UV-VIS: ultraviolet-visible spectroscopy
L: liter
mL: milliliter
Equiv. or eq.: equivalent
kg: kilogram
g: gram
mol: mole
mmol: millimole
min: minute(s)
nm: nanometer(s)
TLC: thin layer chromatography
Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.

Example 1—Synthesis of 2-(2-cyanoacetamido) ethyl methacrylate (A) and 2-(2-cyano-2-(9H-thioxanthen-9-ylidene)acetamido)ethyl methacrylate (B) as Shown in Scheme 2

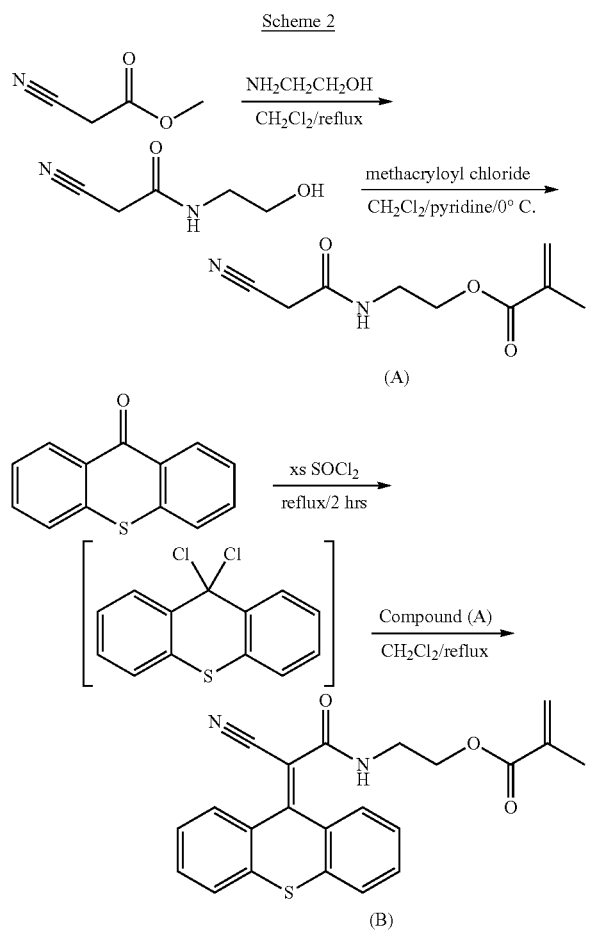

Methyl cyanoacetate (40 grams, 0.4037 mole) and 25 mL of dichloromethane were stirred in a 3 neck, 500 mL round bottom flask under equipped with a reflux condenser under a nitrogen environment. 2-aminoethanol (23.8 grams, 0.3897 mole, ~0.97 eq.) was added to the solution via an addition funnel, after which the temperature rose and the methylene chloride began to reflux. After the exotherm ceased, external heat was applied to continue a gentle reflux for a total of two hours, after which no ethanolamine was observed by thin layer chromatography.

The reaction may also be conducted at room temperature and is complete within a few hours.

The mixture was cooled to room temperature and all the methylene chloride was evaporated at reduced pressure. The residual oil was washed three times with 50 mL of ethyl acetate to remove unreacted starting material and non-polar impurities. The residual ethyl acetate was then removed under reduced pressure, and the resulting oil was used for acylation without any further purification.

The crude N-2-hydroxyethylacetamide derivative was dissolved in 150 mL of dichloromethane containing 40 grams of pyridine (~0.5 mole) in a three-neck round bottom flask equipped with a reflux condenser, an addition funnel, and a magnetic stirring bar. The flask was immersed in an ice bath and allowed to cool down to around 0° C. Methacryloyl chloride (45.76 grams, ~0.44 mole) was added dropwise from the addition funnel, and the resulting reaction mixture was allowed to warm up to room temperature while constantly stirring the system. Methanol (20 mL) was the added to the flask to quench any unreacted methacryloyl chloride. The volatile components were removed by rotary evaporation under reduced pressure, and the crude product dissolved in 800 mL of dilute aqueous HCl. The resulting aqueous solution was extracted three times with 100 mL of hexanes in a separatory funnel to remove any non-polar impurities. The organic layers were discarded. Sodium chloride was added to the aqueous layer which was then extracted three times with 300 mL of ethyl acetate. About 50 milligrams of BHT were added to the combined organic fractions as an inhibitor, and the ethyl acetate removed by rotary evaporation under reduced pressure. The crude product crystalized out of solution during solvent removal. When about 100 mL of ethyl acetate was left in the flask, 250 mL of hexanes was added, and the crude product was isolated by vacuum filtration using a fritted glass funnel. Thin layer chromatography indicated the presence of a single compound. The filter cake was washed two times with 150 mL of hexanes and then vacuum dried at 40° C., yielding 53 grams (about 70% yield) of 2-(2-cyanoacetamido)ethyl methacrylate (A). $^1$H NMR (500 MHz, CDCl$_3$) δ 1.93 (3H, s, CH$_3$), 3.36 (2H, s, CNCH$_2$), 3.60 (2H, dd, CH$_2$NH), 4.26 (2H, t, CH$_2$OC=O), 5.59 (1H, m, vinylic), 6.11 (1H, bs, vinylic), 6.52 (1H, bs, NH).

A mixture of 9H-thioxanthene-9-one (2.12 grams, 0.01 mole) and thionyl chloride (5 mL, 8.2 grams, ~0.07 mole) was refluxed in a 50 mL round bottom flask under a nitrogen atmosphere with constant stirring. After two hours, the red solution was evaporated to dryness ensuring that all unreacted thionyl chloride was removed from the system. 2-(2-Cyanoacetamido)ethyl methacrylate (A) (2.3 grams, 0.0117 mole, ~1.17 eq.) and 15 mL of dichloromethane were added, and the resulting reaction mixture was heated to reflux under a nitrogen blanket. The reaction was monitored by thin layer chromatography. After two hours, no changes were observed in the chromatogram, so the reactive mixture was allowed to cool down to room temperature. 2-(2-cyano-2-(9H-thioxanthen-9-ylidene)acetamido)ethyl methacrylate (B) was isolated as yellow crystals (3.2 grams, 82% yield) after passing through a short silica gel column ($CH_2Cl_2$, followed by 8 weight % EtOAc in $CH_2Cl_2$). The UV-VIS transmission spectrum of a 0.2 mM methanol solution Compound B is shown in FIG. 1. $^1$H NMR (500 MHz, $CDCl_3$) δ 1.84 (3H, s, $CH_3$), 3.47 (2H, m, $CH_2NH$), 4.01 (2H, t, $CH_2OC=O$), 5.55 (1H, m, vinylic), 5.91 (1H, bs, NH), 5.98 (1H, bs, vinylic), 7.24 (1H, t, Ar—H), 7.31 (1H, t, Ar—H), 7.39 (2H, m, Ar—H), 7.49 (1H, d, Ar—H), 7.55 (1H, m, Ar—H), 7.61 (1H, d, Ar—H), 8.04 (1H, m, Ar—H).

Example 2—Synthesis of 2-(2-cyanoacetamido) ethyl methacrylate (F) and N-(2-(2-cyano-2-(9H-thioxanthen-9-ylidene)acetamido)ethyl)methacrylamide (G) as Shown in Scheme 3

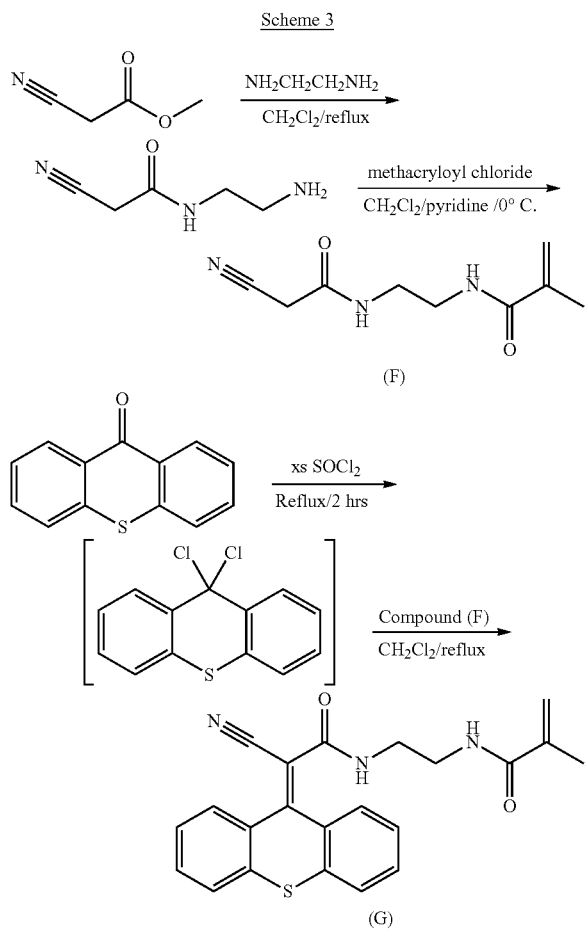

Methyl cyanoacetate (22 grams, 0.22 mole) and 250 mL of dichloromethane were stirred in a 3 neck, 500 mL round bottom flask under equipped with a reflux condenser under a nitrogen environment. The solution is cooled in a water bath and 1,2-diaminoethane (12 grams, 0.2 mole, ~0.9 eq.) added to the mixture. As the reaction progresses, the mixture appears more and more heterogenous, with the product crashing out of solution. After four hours of stirring at room temperature, the volatiles are evaporated under reduced pressure, and the residue is washed with ethyl acetate over a fritted glass funnel and dried at 50° C. prior to further use. $^1$H NMR (500 MHz, $D_2O$) δ 2.74 (2H, t, $CH_2NH_2$), 3.29 (2H, t, $CH_2NH$), 3.38 (2H, s, $CH_2CN$).

2-aminoethyl cyanoacetamide (12.7 g, 0.1 mole) and 12.0 grams of sodium carbonate are stirred in 150 mL of methanol while being chilled in an ice bath. Methacryloyl chloride (11.5 g, 1.1 eq.) is added to the suspension in a dropwise manner, while maintaining the reaction temperature below 30° C. at all times. Once the reaction is complete, evaporate all volatiles under reduced pressure, redissolve the product in acetonitrile and filter the solution to remove all the salts present. Evaporate the acetonitrile under reduced pressure and wash the resulting solids with ethyl acetate over a fritted glass funnel to obtain the desired 2-(2-cyanoacetamido)ethyl methacrylamide (F). $^1$H NMR (500 MHz, $CD_3OD$) δ 1.86 (3H, s, $CH_3$), 3.22-3.26 (4H, m, NH, $CH_2CN$), 3.29 (4H, m, $CH_2NH$), 5.31 (1H, m, vinylic), 5.63 (1H, m, vinylic).

Figure 2:
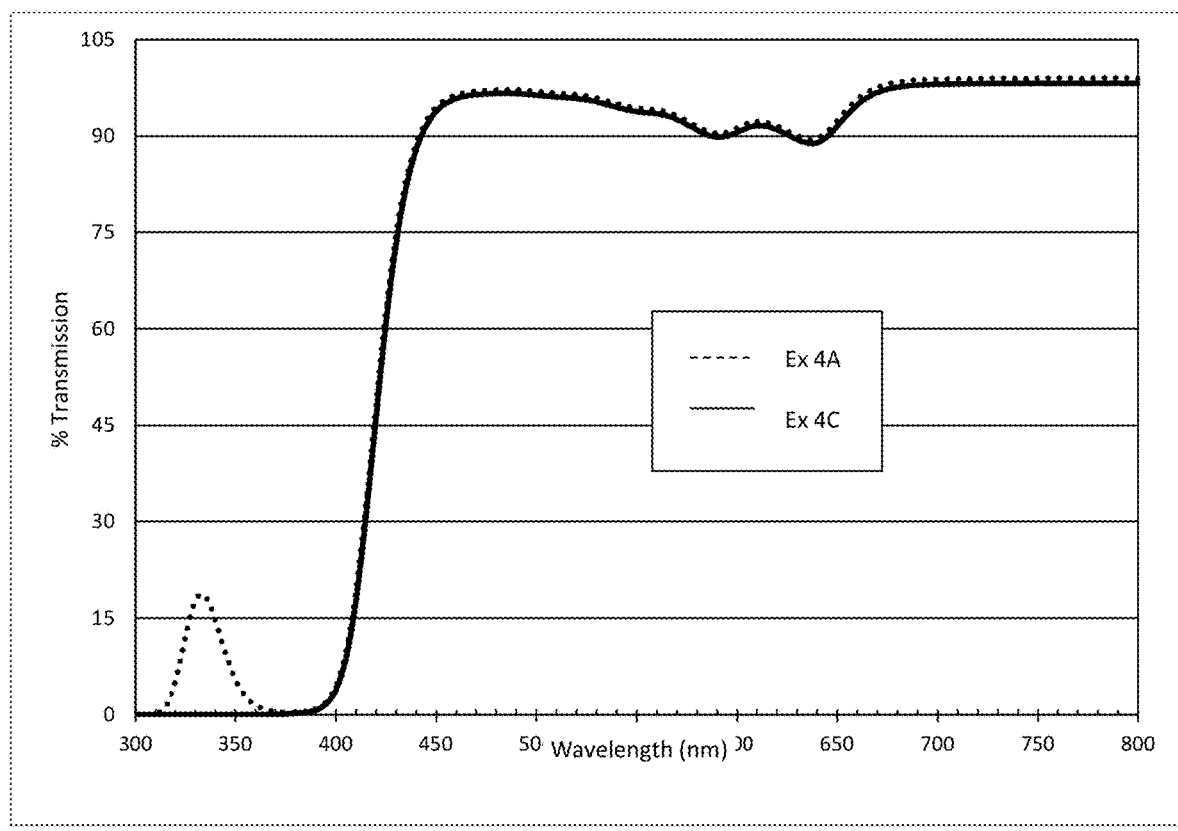
FIG. 2 shows UV-VIS transmission spectrum of silicone hydrogel contact lenses of Examples 4A and 4C.

A mixture of thioxanthone (4.24 grams, 0.02 mole) and 8 mL of thionyl chloride (13.12 grams, ~0.11 mole) was gently refluxed under a nitrogen atmosphere with constant stirring. After two hours of heating, the solution was evaporated to dryness under reduced pressure, ensuring that all unreacted thionyl chloride was removed. 2-(2-cyanoacetamido)ethyl methacrylamide (F) (4.2 grams, ~1.1 eq.) and 20 mL of degassed methylene chloride were added to the flask, and the mixture was gently refluxed for 3 hours under a nitrogen environment, while monitoring the progress by TLC. The volatiles were evaporated under reduced pressure, and the organics are washed with ethyl acetate. Large quantities of a precipitate enriched with the major product were observed. The suspension was filtered, and the residual solids washed with ethyl acetate prior to drying in a vacuum oven. The UV-VIS transmission spectrum of a 0.2 mM methanolic solution of Compound G is shown in FIG. 2. $^1$H NMR (500 MHz, $CDCl_3$) δ 1.89 (3H, s, $CH_3$), 3.26 (2H, m, $CH_2NH$), 3.32 (2H, m, $CH_2NH$), 5.33 (1H, m, vinylic), 5.68 (1H, m, vinylic), 6.63 (1H, m, NH), 6.49 (1H, m, NH), 7.25 (1H, m, Ar—H), 7.33 (1H, dt, Ar—H), 7.39 (2H, m, Ar—H), 7.51-7.59 (3H, m, Ar—H), 8.05 (1H, m, Ar—H).

Example 3—Synthesis of 2-(2-cyanoacetoxy)ethyl methacrylate (K) and 2-(2-cyano-2-(9H-thioxanthen-9-ylidene)acetoxy)ethyl methacrylate (L) as Shown in Scheme 4

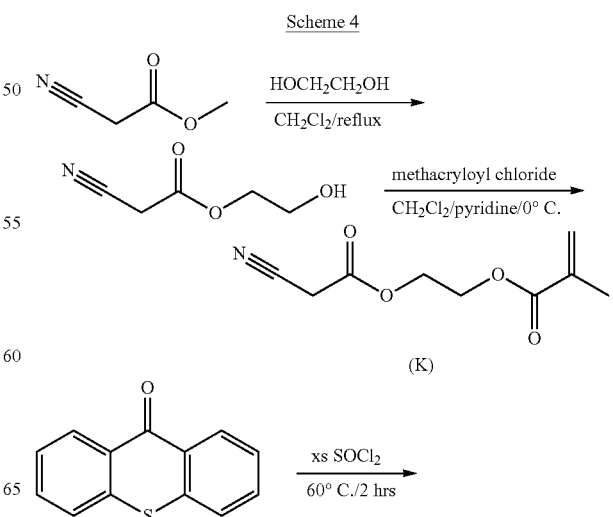

-continued

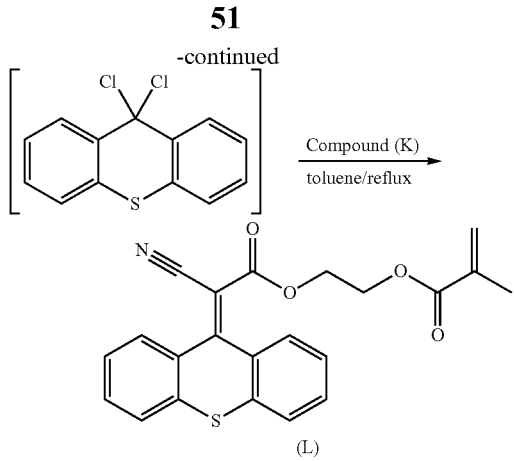

(L)

2-(2-Cyanoacetoxy)ethyl methacrylate (K) was prepared by coupling cyanoacetic acid with 2-hydroxyethyl methacrylate as follows. Cyanoacetic acid (9 g, 0.106 mole) and 13 g of 2-hydroxyethyl methacrylate (HEMA, are stirred in 250 mL of dichloromethane, and ethyl dimethylaminopropyl carbodiimide hydrochloride (EDC) is added to the suspension in 4 batches of 5 grams each (20 g, 0.104 mole). The mixture gradually becomes more homogenous as the less polar derivative is formed and volatiles are evaporated under reduced pressure after completion of the reaction. The product is redissolved in a 25:75 mixture of ethyl acetate and hexanes by weight and extracted several times with deionized water to remove any residual salts and unreacted HEMA. A small amount of 4-methoxyhydroquinone (<20 mg) is added to the organic layer and the product is obtained pure after evaporation of the solvents under reduced pressure. $^1$H NMR (500 MHz, CDCl$_3$) δ 1.92 (3H, m, CH$_3$), 3.47 (2H, S, NCCH$_2$), 4.36 (2H, m, OCH$_2$), 4.44 (2H, m, OCH$_2$), 4.59 (1H, m, vinylic), 6.10 (1H, m, vinylic).

A mixture of thioxanthone (4.24 grams, 0.02 mole) and 8 mL of thionyl chloride (13.12 grams, ~0.11 mole) was gently refluxed under a nitrogen atmosphere with constant stirring. After two hours of heating, the solution was evaporated to dryness under reduced pressure, ensuring that all unreacted thionyl chloride was removed. A solution of 2-(2-cyanoacetoxy)ethyl methacrylate (K) (4.33 grams, ~1.1 eq.) in 20 mL of degassed methylene chloride was added to the flask, and the mixture was gently refluxed for 3 hours under a nitrogen environment, while monitoring the progress by TLC. The residue was washed with methanol to remove most of the unreacted starting thioxanthone, reconcentrated, and the crude product was purified by chromatography over a silica gel plug and vacuum dried overnight. The UV-VIS transmission spectrum of a 0.2 mM solution of Compound L in dichloromethane is shown in FIG. 2. $^1$H NMR (500 MHz, CDCl$_3$) δ 1.92 (3H, s, CH$_3$), 4.36 (2H, m, CH$_2$), 4.44 (2H, m, CH$_2$), 5.59 (1H, m, vinylic), 6.10 (1H, m, vinylic), 7.24-7.62 (7H, m, Ar—H), 8.1 (1H, m, Ar—H).

Example 4—Silicone Hydrogel Formulations Comprising Compound (B)

Reactive monomer mixtures were prepared composed of 77 weight percent of the formulations listed in Table 4, and 23 weight percent of the diluent D3O. The reactive monomer mixtures were individually filtered through a 3 μm filter using a stainless-steel syringe under pressure.

TABLE 4

| Component | Ex 4A (weight %) | Ex 4B (weight %) | Ex 4C (weight %) | Ex 4D (weight %) |
|---|---|---|---|---|
| mPDMS 1000 | 30.85 | 30.7 | 30.55 | 30.39 |
| SiMAA | 27.61 | 27.48 | 27.35 | 27.2 |
| DMA | 23.76 | 23.6 | 23.53 | 23.4 |
| HEMA | 5.94 | 5.91 | 5.88 | 5.85 |
| TEGDMA | 1.52 | 1.52 | 1.51 | 1.5 |
| PVP K90 | 6.9 | 6.9 | 6.8 | 6.8 |
| Irgacure 1870 | 0.35 | 0.34 | 0.34 | 0.34 |
| RB247 | 0.02 | 0.02 | 0.02 | 0.02 |
| Compound (B) | 3.05 | 3.03 | 3.02 | 3 |
| Norbloc ® | 0 | 0.5 | 1 | 1.5 |
| Σ Components | 100 | 100 | 100 | 100 |

Formulations 4A-4D were degassed at ambient temperature by applying vacuum (40 torr) for 45 minutes. Then, in a glove box with a nitrogen gas atmosphere and less than about 0.1-0.2 percent oxygen gas, about 75 μL of the reactive mixture were dosed using an Eppendorf pipet at room temperature into the FC made of 90:10 (w/w) Zeonor/TT blend. The BC made of 90:10 (w/w) Z:TT blend was then placed onto the FC. The molds were equilibrated for a minimum of twelve hours in the glove box prior to dosing. Pallets containing eight mold assemblies each were transferred into an adjacent glove box maintained at 65° C., and the lenses were cured from the top and the bottom for 15 minutes using 435 nm LED lights having an intensity of about 2 mW/cm$^2$ at the tray's location.

The lenses were manually de-molded with most lenses adhering to the FC and released by suspending the lenses in about one liter of 70 percent IPA for about one hour, followed by soaking two more times with fresh 70 percent IPA for 30 minutes; then two times with fresh DIW for 15 minutes; then two time with packing solution for 30 minutes. The lenses were equilibrated and stored in borate buffered packaging solution. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The average center thickness of each lens set was measured; 4A=87.7 microns, 4B=85.3 microns, 4C=87.3 microns, and 4D=85.7 microns.

Figure 3:
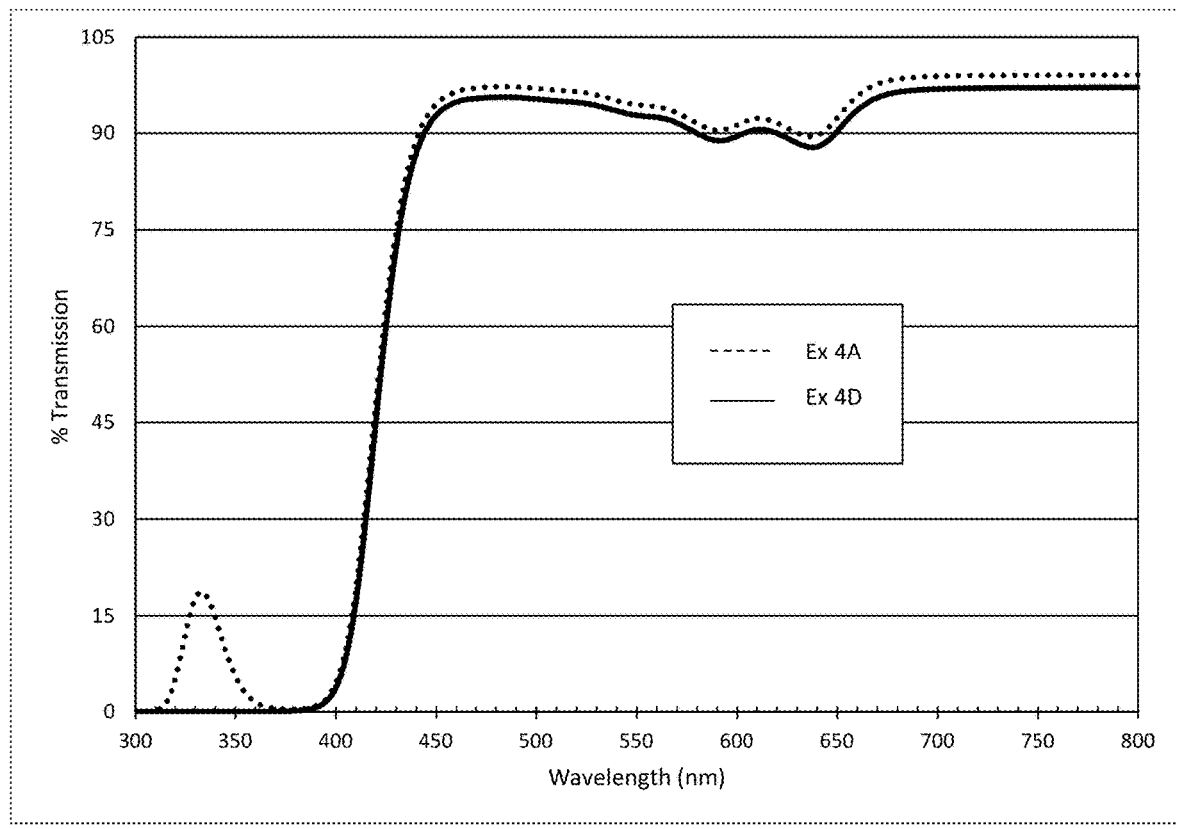
FIG. 3 shows UV-VIS transmission spectrum of silicone hydrogel contact lenses of Examples 4A and 4D.

FIGS. 1-3 show the UV-VIS spectra of the lenses made from Formulations 4A-4D demonstrating that compound (B) or combinations of compound (B) and Norbloc® may provide complete or nearly complete absorption between 300 nm and 400 nm with some absorption in the high energy visible region between 400 nm and 450 nm.

Example 5—Photostability

Silicone hydrogel contact lenses made from a reactive mixture containing compound (B) were subjected to photostability testing as described above. The spectral transmittance results at 380 to 450 nm of the lens containing compound (B) that had been photo-exposed under ICH-Q1B conditions, versus a contact lens containing compound (B) but without photo-exposure are shown Table 5. The data demonstrates that lenses containing HEV light absorbing compounds as described herein are photostable.

TABLE 5

| Power | Lens exposure | Packaging | % T (380-450 nm) | % Change |
|---|---|---|---|---|
| −3.00 D | Control | Clear Blister | 37 | 5.4 |
| | ICH-Q1B | Clear Blister | 39 | |
| −1.00 D | Control | Clear Blister | 39 | 0 |
| | ICH-Q1B | Clear Blister | 39 | |
| −6.00 D | Control | Clear Blister | 38 | 0 |
| | ICH-Q1B | Clear Blister | 38 | |

Example 6—Clinical Testing

Test lenses, which are silicone hydrogel contact lenses made from a reactive mixture containing 3 weight percent of compound (B), were evaluated in various clinical studies as described below. The purpose of the studies was to assess the visual effects of wearing test lenses, which absorb HEV light, including across the wavelength range of 400 to 409 nm, with a direct comparison to a lens that does not contain a compound that absorbs in the 400 to 409 nm range. The control lens is an Acuvue® OASYS lens available from Johnson & Johnson Vision Care, Inc.

The study shows that a lens of the invention may provide improvement in visual performance in a contact lens wearer, for instance by improving one or more desirable attributes such as by reducing light scattering, starbursts, halos, glare discomfort, or improving a wearer's glare disability threshold and/or heterochromatic contrast threshold, or photostress recovery time, relative to the control lens. It is understood that data is presented herein for purposes of illustration and should not be construed as limiting the scope of the disclosed technology in any way or excluding any alternative or additional embodiments.

The study is a single-site, single-visit, contralateral, non-dispensing, randomized, controlled and single-masked study. At Visit 1 subjects are randomly assigned to one of two lens wear arms (left: Test, right: Control or left: Control, right: Test) and undergo Psychophysical Testing as described below. The study involved approximately 60 subjects.

Glare Discomfort (GDC). GDC may be evaluated by squint response to a photostressor. Squint response may be captured by using a high-resolution camera for each subject eye. The resultant videos may then be analyzed as still frames. Squint response may be quantified as the calculated ratio (in mm) of the height of the palpebral fissure under normal light conditions compared to maximal squint produced during the photostress exposure. More specifically, glare discomfort (GDC) will be quantified using the squint response and a questionnaire. The discomfort that accompanies exposure to light in excess of an individual's adaptive state is accompanied by contraction of the extraocular muscles (squint). The squint response has been shown to be a valid objective indicator of glare discomfort. Degree of squint is calculated as the ratio of the height of the palpebral fissure under normal lighting conditions compared to maximal squint produced during the photostress exposure. A high-resolution camera (AmScope MU300 digital camera; Irvine, CA) will be used and calibrated against a spatial standard before the start of each day of testing. The resultant videos will be analyzed as still frames using AmScope measurement software (Irvine, CA). In order to determine subjective ratings of GDC, subjects will be asked to rate the degree of discomfort of the photostressor using a single-item questionnaire OD (right eye) and OS (left eye): How bothersome was the glare that you just experienced? Subjects will have the following response options: Extremely bothersome, Very bothersome, Somewhat bothersome, A little bothersome, Not at all bothersome.

Glare Disability (GD) Threshold. GD threshold may be evaluated by exposing subjects to various intensities of a whitelight annulus (~10-deg diameter) and quantified by the log relative energy level necessary to obscure a central target. More specifically, the target stimulus will be presented for 2 seconds on and 1 second off to reduce the chances that subjects will habituate to the stimulus. A second channel will provide an annulus with an approximately 11-degree inner diameter and 12-degree outer diameter. Before each trial, the annulus will be set at a level well below that which would cause the target stimulus to be veiled. The experimenter will then adjust, via neutral-density wedge, the intensity of the annulus until the target stimulus is no longer visible. Participants will indicate that the target has been veiled by pressing a buzzer. Effectively, in this task, the experimenter increases the intensity of light scattering within the subjects' test eyes until the subject cannot effectively see. Unlike the photostress bleach which is set and standard across subjects, the intensity is varied in this test, and hence, so is the aversiveness of the dependent variable.

Hetero Chromatic Contrast (HCC) Threshold. HCC threshold may be evaluated using a variable wavelength central target presented on a short-wave (460 nm) sky-light background and quantified by the amount of light absorbed by the macula.

Halos. Halos may be quantified by the diameter (mm) of outer edges of the halo image and may be measured using the same micrometer as for starbursts and light scattering. More specifically, subjects will have the nature of halos explained using visual aids prior to the experiment. The halo measurement will utilize the same light source as the starburst and two-point measures to produce the halo. The same calibrated micrometer from the starburst test will be used to define the outer edges of the halo image (investigator adjusting based on subject feedback). Ascending and descending methods of limits will be used. This measurement takes about 10-15 minutes. Record values OD (right eye) and OS (left eye), in mm (2 decimal places). Subjects will respond to a single-item post-halo questionnaire OD and OS: How severe/intense was the halo that you experienced? Subjects will have the following response options: Severe, moderate, mild, not at all.

Starbursts. Starbursts may be quantified by the diameter of a light's lateral spread. A calibrated micrometer (two sides with reverse threading) is used to spread two posts out from a central mid-point). Those posts can then be used to define the outer boundaries of the starburst image (i.e. the diameter). More specifically, subjects will have the nature of starbursts explained using visual aids prior to the experiment. The investigator will adjust the micrometer to spread two posts out from a central mid-point. Those posts will be used to define the outer boundaries of the starburst image. Ascending and descending methods of limits would be used based on subject feedback. This measurement takes about 10-15 minutes. Record values OD (right eye) and OS (left eye), in mm (2 decimal places). Subjects will respond to a single-item poststarburst questionnaire OD and OS: How severe/intense was the starburst that you experienced? Subjects will have the following response options: Severe, moderate, mild, not at all.

Light Scattering. Light scattering (two-point light spread function) is defined as the minimum distance (mm) that two points of light are completely distinct. These two-point thresholds can be measured with and without the addition of interference filters that change the wavelength of the light and, thus, the appearance of the scatter More specifically, the thresholds are defined as the minimum distance that two points of light are completely distinct. An ascending method of limits will be used. Testing will take place with and without the presence of a 403 nm interference filter in the optical path. Briefly, the investigator will begin with the two points of light 0 mm from each other. At the distance at which the subject is positioned, this initial position will appear as a single point of light. The investigator will slowly increase the distance between the two points until the participant sees two, distinct points of light separated by a black space. The distance between the two points will then be recorded as the subject's two-point threshold.

Photostress Recovery Time (PRT). PRT may be evaluated by exposing subjects to an intense light source (10-deg circular broad-band white at ~4.5 log Tds) and quantified as the time necessary to regain site of the grating after exposure to the photostressor. More specifically, to measure PRT, participants will be exposed to the same target used in each of the other visual function tests. Once the participant is comfortably viewing the target, the experimenter will the target with a bright, bleaching light, for a 5-second period. Exposure to the light will cause participants to momentarily lose sight of the target, which will be covered by an afterimage. As the afterimage fades, participants will gradually be able to re-gain sight of the target. PRT will be recorded as the time it takes following exposure to the bleaching light to regain sight of the target.

The psychophysical metrics of GD, HCC, PRT, and GDC are recorded in the presence of a light source containing HEV light. An optical bench set up is used.

Statistical Analyses

All data summaries and statistical analyses were performed using the SAS software Version 9.4 (SAS Institute, Cary, NC). Throughout the analysis of data, the results for each subject/eye were used when available for summarization and statistical analysis.

Light Scattering (mm). Two-Point Light spread function was assessed under two filter conditions; with a distance filter and without a distance filter. In this study there were many high-lying outliers causing the distribution of Two-Point Light spread function to be skewed to the right. Therefore, the planned analysis of a linear model could not be performed since the distribution do not meet the normality assumption for a linear mixed model. Instead, log transformation was used for Two-Point Light spread function in both conditions (with and without a distance filter). Hence, the transformed data was analyzed separately using a linear mixed model with a normal distribution.

Each model included: study lens, dominant eye, age group, all possible interactions between study lens and age group and the interaction between study lens and dominant eye were included as fixed effects. The Kenward and Roger Method was used for the denominator degrees of freedom. An unstructured (UN) covariance structure was used to model the residual errors between eyes within the same subject. The unstructured (UN) covariance structure was selected since this structure returned the lowest Akaike's Information Criterion Corrected (AICC).

Halos. Halos (mm) were analyzed using a linear mixed model. The model included: lens type, dominant eye, age group, and the two-way interactions (lens type by age group and lens type by dominant eye) were included as fixed effects. The Kenward and Roger Method was used for the denominator degrees of freedom. A compound symmetric (CS) covariance structure was used to model the residual errors between eyes within the same subject. The compound symmetric covariance structure was selected since this structure returned the lowest Akaike's Information Criterion Corrected (AICC).

Starbursts. Starbursts (mm) were analyzed using a linear mixed model. The model included: lens type, dominant eye, age group, and the two-way interactions (lens type by age group and lens type by dominant eye) were included as fixed effects. The Kenward and Roger Method was used for the denominator degrees of freedom. A compound symmetric (CS) covariance structure was used to model the residual errors between eyes within the same subject. The compound symmetric covariance structure was selected since this structure returned the lowest Akaike's Information Criterion Corrected (AICC).

Photostress Recovery (PR) Time (seconds). In this study there were many high-lying outliers (long PR times) causing the distribution of PR time to be skewed to the right. Therefore, the planned analysis of a linear model could not be performed since the distribution of PR time no longer met the assumption of normality for a linear model. Instead, PR time was analyzed using a generalized linear mixed model with a lognormal distribution. Study lenses, age group, dominant eye and the interaction between study lenses and age group were included in the model as fixed effects. A compound symmetric (CS) covariance structure was used to model the residual errors between eyes within the same subject. The Kenward and Roger Method (was used for the denominator degrees of freedom.

Glare Disability Threshold. Glare disability threshold was analyzed using mixed model. Study lenses, age group, the interaction between study lenses and age group and the interaction between study lens and dominant eye were included as fixed effects. A compound symmetric (CS) covariance structure was used to model the residual errors between eyes within the same subject. The Kenward and Roger Method was used for the denominator degrees of freedom.

Glare Discomfort (change in palpebral fissure height). Glare discomfort was analyzed using mixed model. Study lenses, age group and the interaction between study lenses and age group were included as fixed effects. A compound symmetric (CS) covariance structure was used to model the residual errors between eyes within the same subject. The Kenward and Roger Method was used for the denominator degrees of freedom. Heterochromatic Contrast Threshold Heterochromatic Contrast Threshold. HCC was analyzed using mixed model. Lens type, age group and the interaction between lens type and age group were included as fixed effects. A compound symmetric (CS) covariance structure was used to model the residual errors between eyes within the same subject. The Kenward and Roger Method (was used for the denominator degrees of freedom.

Study Results

Figure 4:
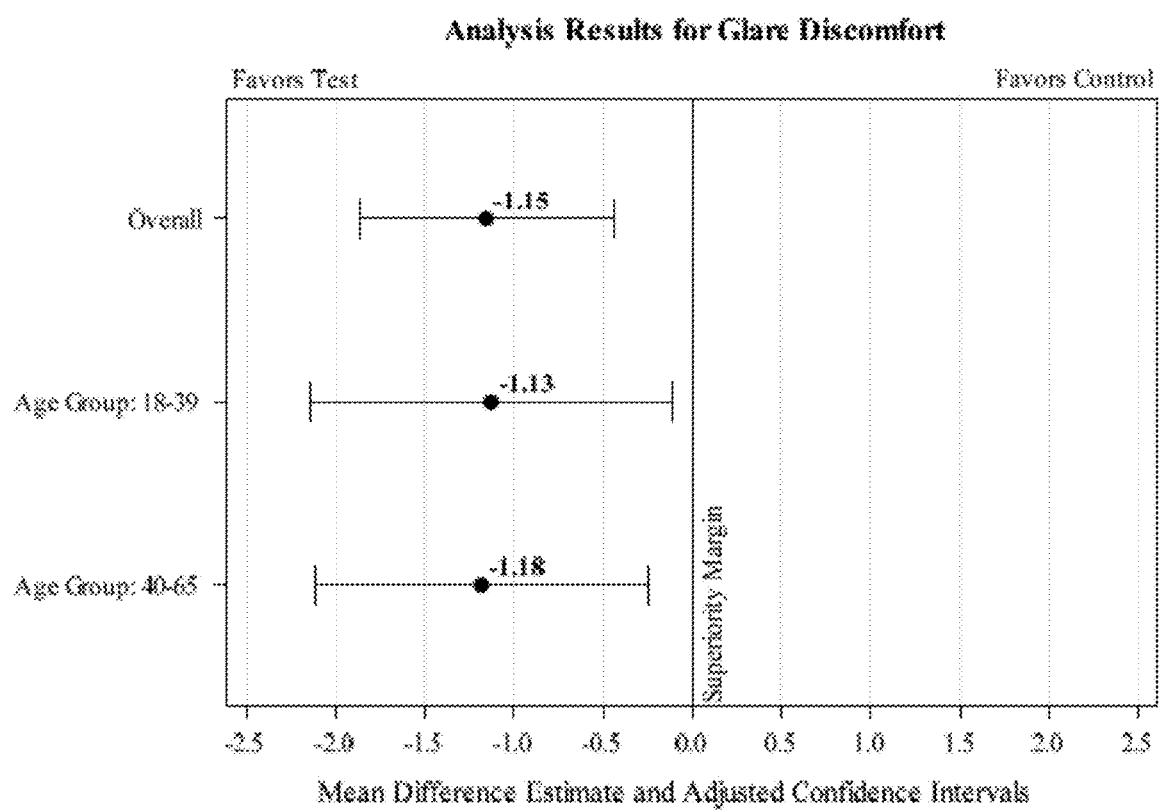
FIG. 4 shows clinical results for glare discomfort of a test lens compared to a control lens in various age groups.
Figure 5:
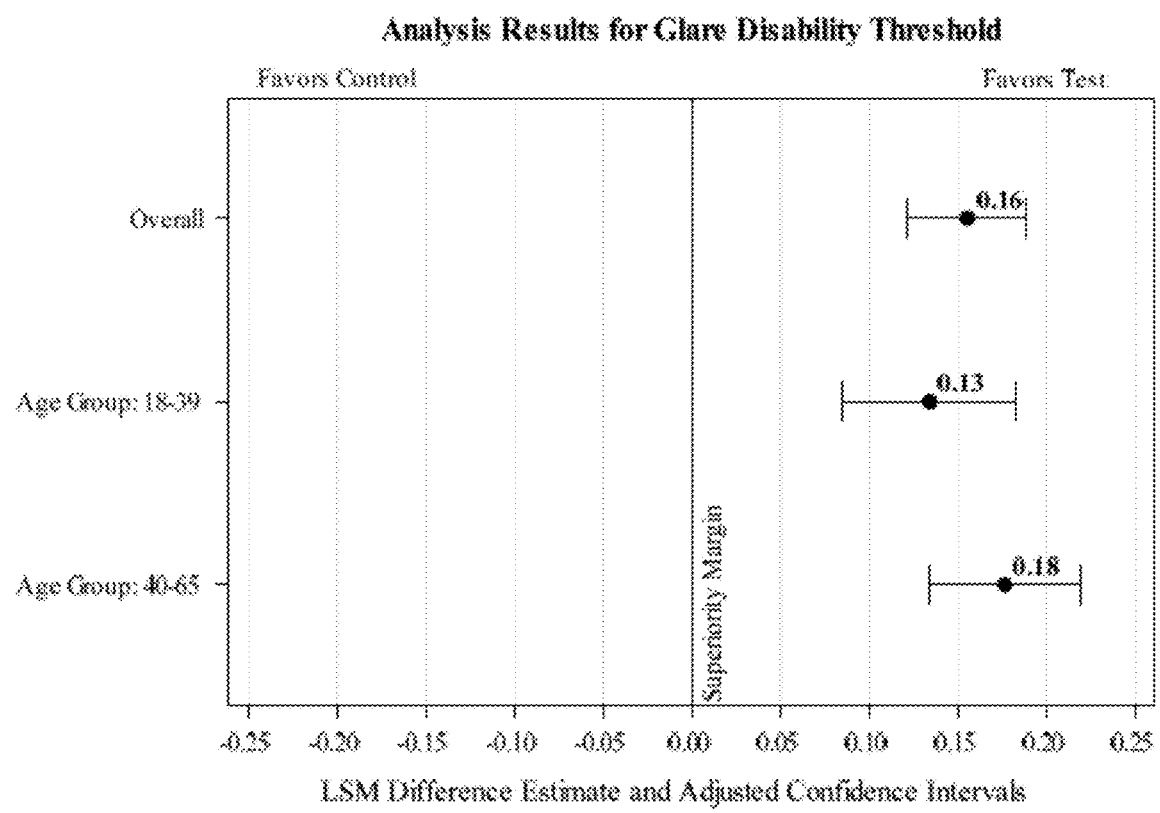
FIG. 5 shows clinical results for glare disability threshold of a test lens compared to a control lens in various age groups.
Figure 6:
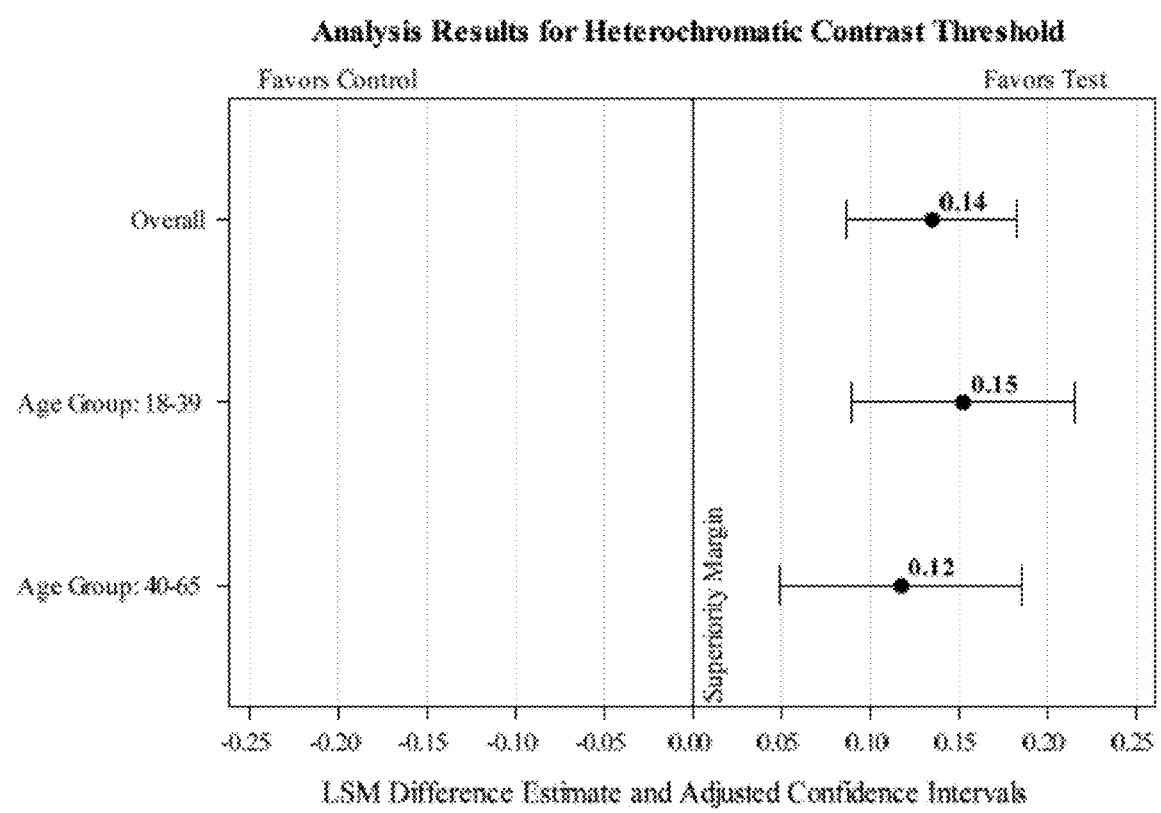
FIG. 6 shows clinical results for heterochromatic contrast threshold of a test lens compared to a control lens in various age groups.
Figure 7:
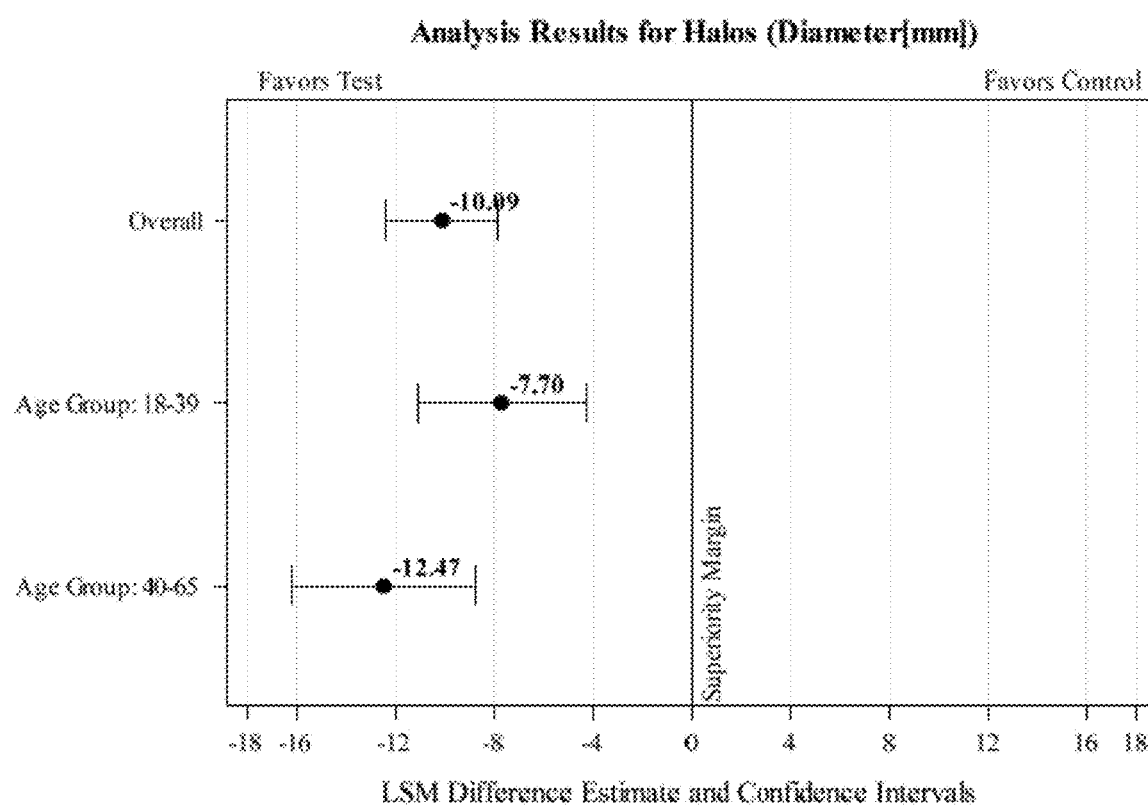
FIG. 7 shows clinical results for halos of a test lens compared to a control lens in various age groups.
Figure 8:
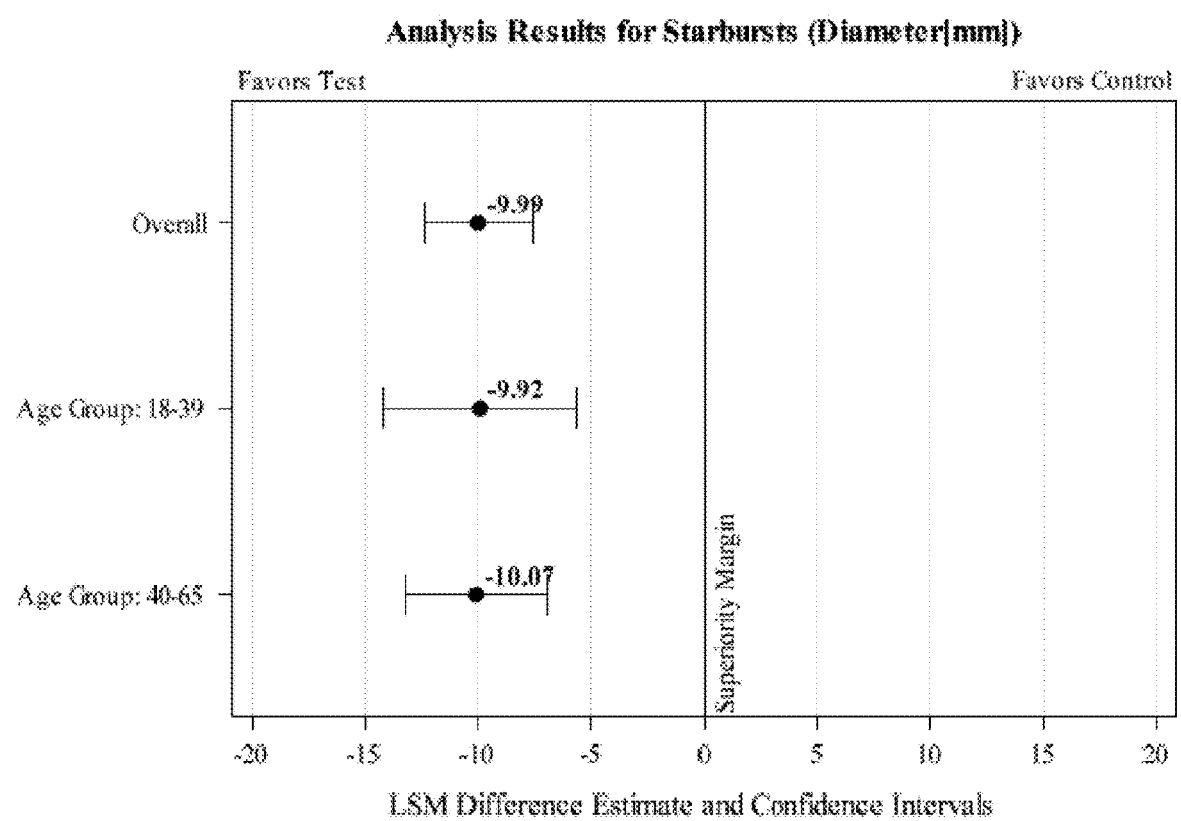
FIG. 8 shows clinical results for starbursts of a test lens compared to a control lens in various age groups.
Figure 9:
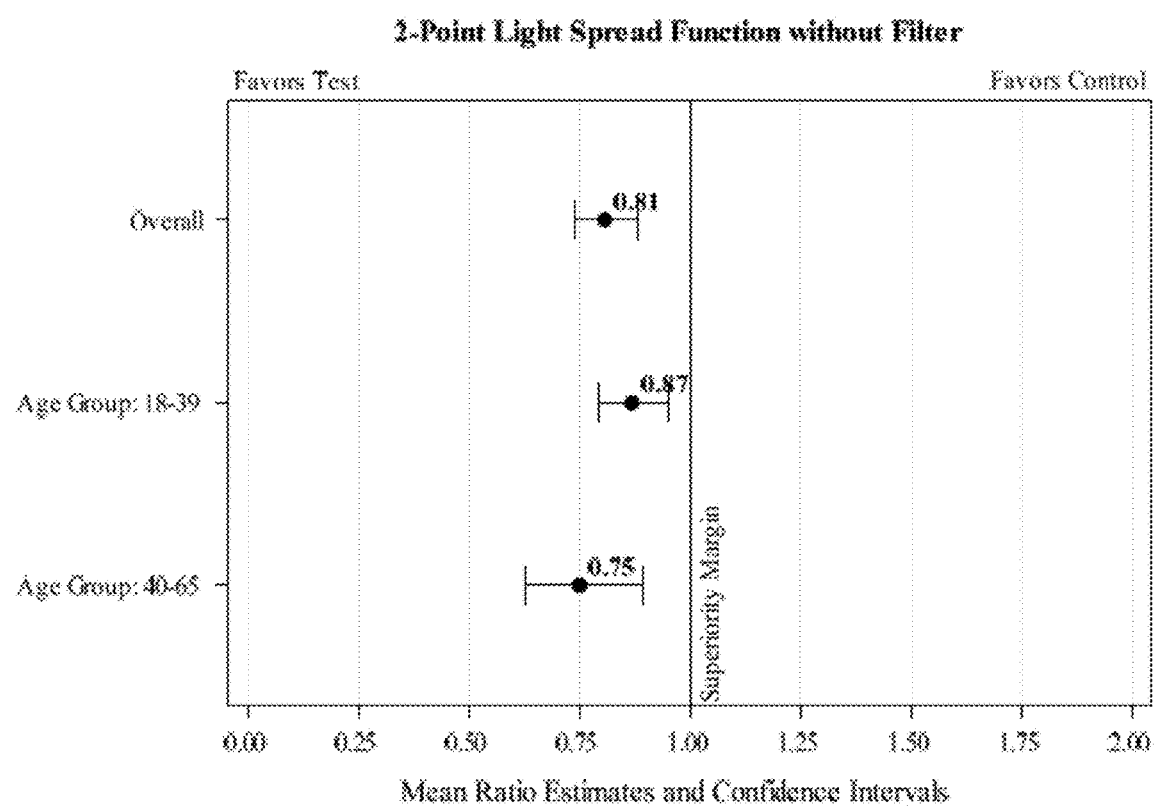
FIGS. 9 and 10 show clinical results for light scatter of a test lens compared to a control lens in various age groups.
Figure 10:
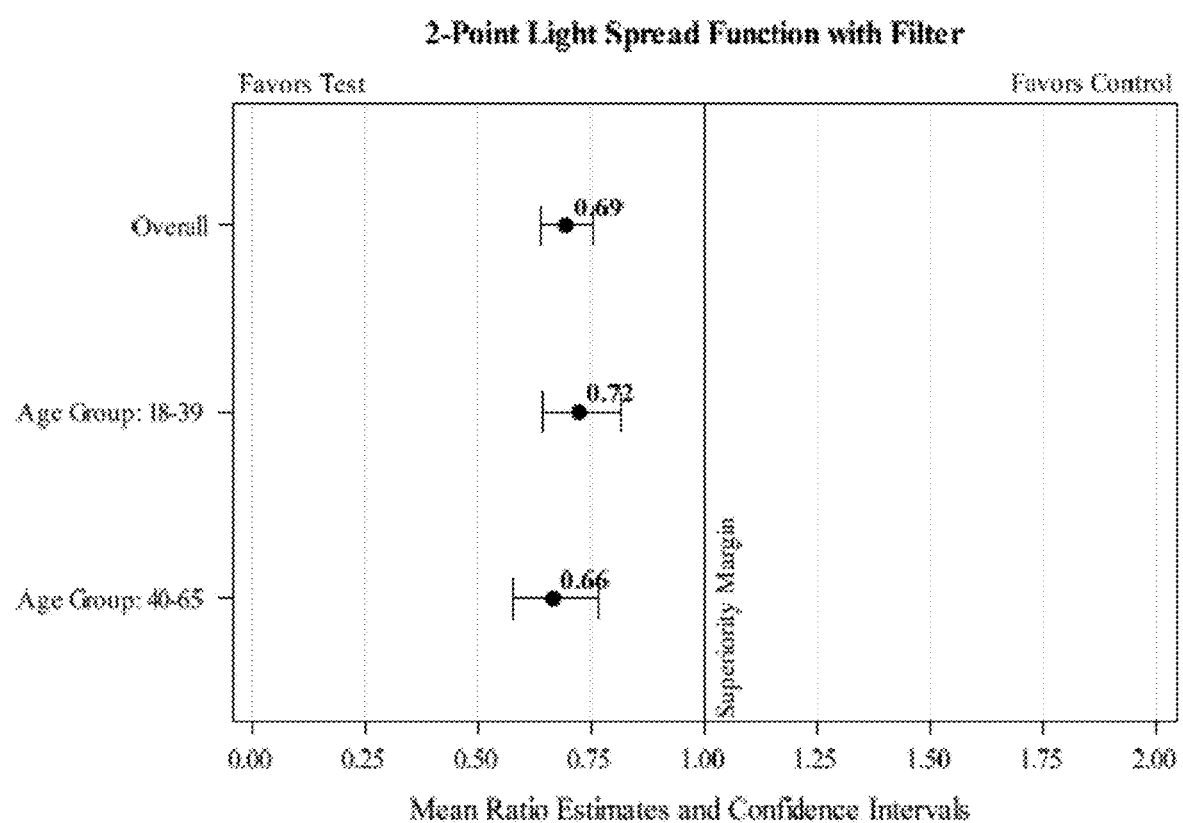
Figure 11:
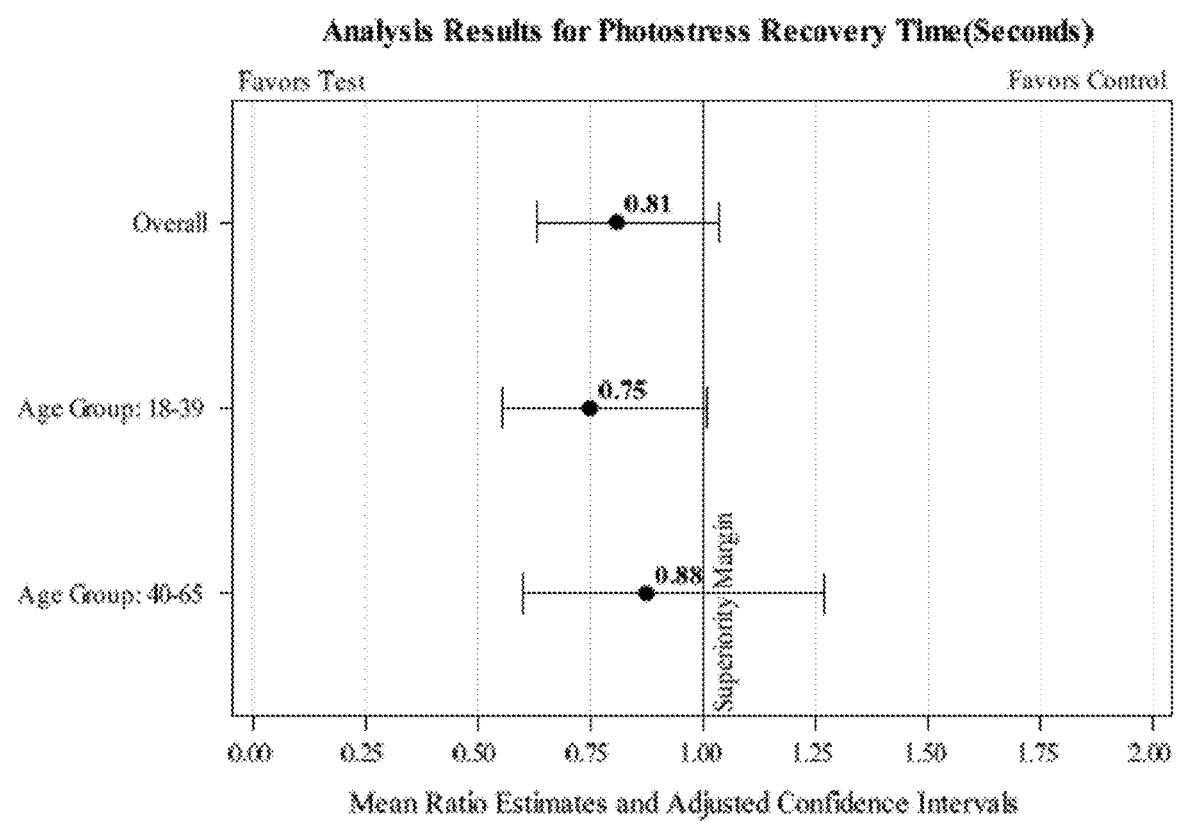
FIG. 11 shows clinical results for photostress recovery time of a test lens compared to a control lens in various age groups.

The study results for glare discomfort, glare disability threshold, chromatic contrast threshold, haloes, starbursts, and light scattering, and photostress recovery time, are shown in FIGS. 4-10, respectively. In each case, the data demonstrates an improvement, and in some cases a clinically significant improvement, with the test lens as compared to the control lens. Thus, FIG. 4 shows that patients squinted less in the test lens as compared to the control lens. FIG. 5 shows that patients wearing the test lens could be exposed to a higher light intensity than the control lens, before the target disappeared. FIG. 6 shows that patients wearing the test lens could be exposed to a higher light intensity before a green target disappeared from a blue background. FIG. 7 shows that patients wearing the test lens experienced smaller halos than when wearing the control lens. FIG. 8 shows that patients wearing the test lens experienced smaller starbursts than when wearing the control lens. FIGS. 9 and 10 show that patients wearing the test lens experienced less light scatter than when wearing the control lens. FIG. 11 shows a trend towards improved photostress recovery time. Clinically significant improvements were observed for glare discomfort, glare disability threshold, heterochromatic contrast threshold, halo size, starburst size, and light scattering.

Examples 7-24. Pervaporation Rate

Pervaporation rates of several commercially available contact lenses, representing comparative ("comp") examples, were measured and compared to a contact lens of the invention ("inv"), containing Compound B. The pervaporation rates (in units of uL/min*cm$^2$) and their standard deviations ("SD") at various relative humidities ("RH") are shown in Table 6. Data at 0% RH are also plotted in FIG. 12.

Figure 12:
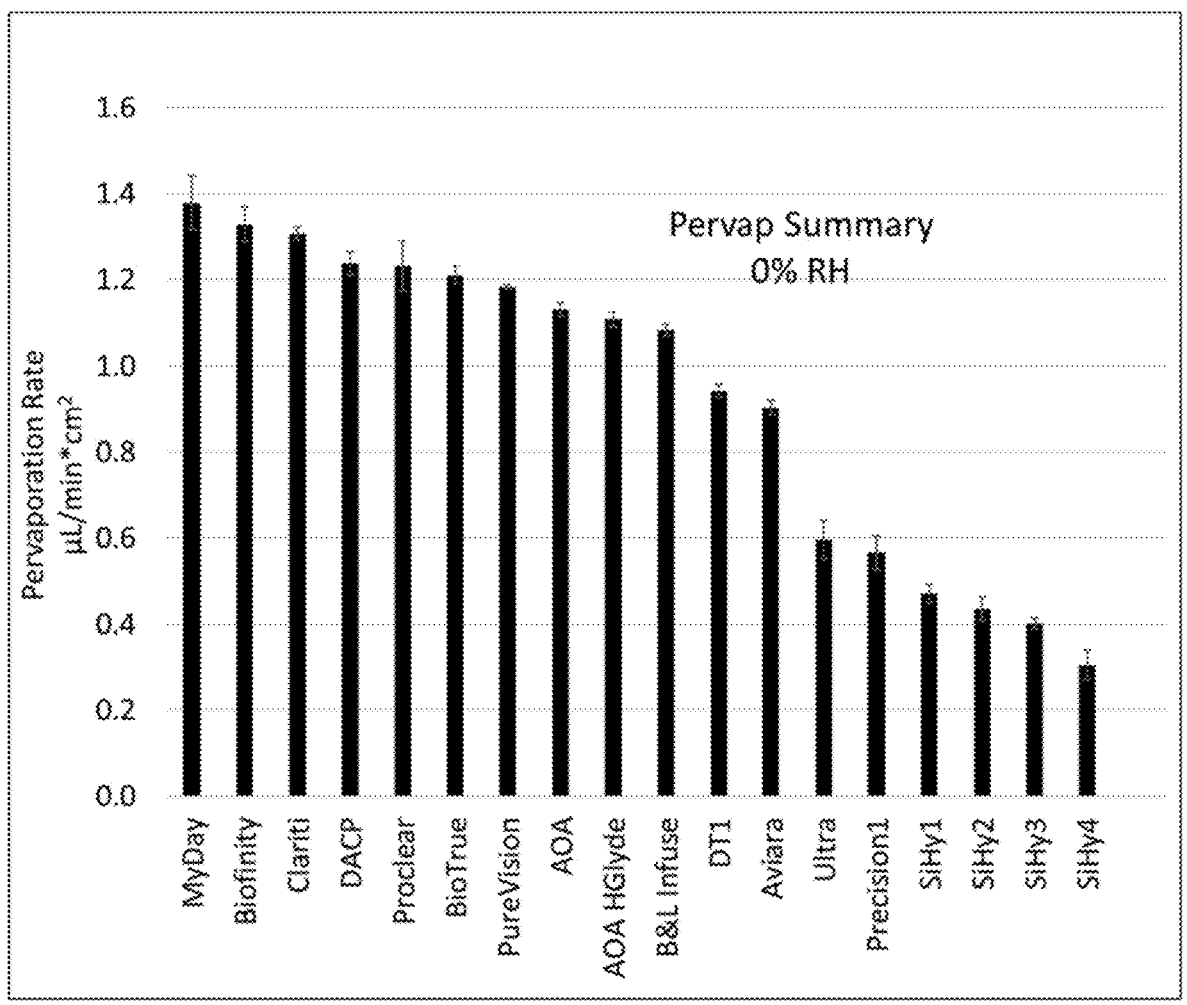
FIG. 12 is a bar graph showing pervaporation rates for commercially available lenses as compared to a lens of the invention.

In Table 6 and FIG. 12, SiHy1 is a silicone hydrogel contact lens obtained from a reactive mixture that includes about 7 weight percent PVP K90, but no HEV filter. SiHy3 is a lens of the invention obtained from a reactive mixture that includes mPDMS 1000, SiMAA, DMA, HEMA, Norbloc, PVP K90 (7 weight percent) and an HEV light filtering compound (Compound (B), 3 weight percent). SiHy2 and SiHy4 are silicone hydrogel contact lenses obtained from reactive mixture that include, respectively, about 9 weight percent and about 12 weight percent of PVP K90, but no HEV filter. SiHy1, SiHy2, and SiHy4 are commercially available prior art lenses sold by Johnson & Johnson Vision Care, Inc., under the ACUVUE® trademark.

TABLE 6

| Ex. (type) | Lenses[1] | SiHy | HEV in RM | Pervap. Rate 80% RH (SD) | Pervap. Rate 50% RH (SD) | Pervap. Rate 30% RH (SD) | Pervap. Rate 0% RH (SD) |
|---|---|---|---|---|---|---|---|
| 7 (comp) | MyDay® | Y | N | 0.22 (0.01) | 0.66 (0.03) | 0.96 (0.04) | 1.38 (0.06) |
| 8 (comp) | Biofinity® | Y | N | 0.23 (0.01) | 0.66 (0.01) | 0.96 (0.02) | 1.33 (0.04) |
| 9 (comp) | Clariti® | Y | N | 0.21 (0.00) | 0.63 (0.01) | 0.91 (0.01) | 1.31 (0.01) |
| 10 (comp) | Dailies® AquaComfort Plus® | N | N | 0.22 (0.02) | 0.60 (0.01) | 0.87 (0.02) | 1.24 (0.03) |
| 11 (comp) | Proclear® | Y | N | 0.22 (0.01) | 0.61 (0.02) | 0.87 (0.04) | 1.23 (0.06) |
| 12 (comp) | BioTrue® | N | N | 0.23 (0.01) | 0.60 (0.01) | 0.86 (0.02) | 1.21 (0.02) |
| 13 (comp) | PureVision® | Y | N | 0.21 (0.00) | 0.58 (0.01) | 0.84 (0.01) | 1.18 (0.01) |
| 14 (comp) | Air Optix® Aqua | Y | N | 0.21 (0.01) | 0.58 (0.01) | 0.83 (0.01) | 1.13 (0.02) |
| 15 (comp) | Air Optix® Plus HydraGlyde® | Y | N | 0.22 (0.00) | 0.59 (0.01) | 0.83 (0.01) | 1.11 (0.02) |
| 16 (comp) | Infuse™ | Y | N | 0.24 (0.00) | 0.59 (0.01) | 0.84 (0.01) | 1.08 (0.01) |
| 17 (comp) | Dailies Total1® | Y | N | 0.23 (0.01) | 0.60 (0.03) | 0.82 (0.03) | 0.94 (0.02) |
| 18 (comp) | Avaira Vitality™ | Y | N | 0.22 (0.00) | 0.58 (0.01) | 0.79 (0.01) | 0.90 (0.02) |
| 19 (comp) | Ultra® | Y | N | 0.21 (0.01) | 0.45 (0.02) | 0.54 (0.04) | 0.60 (0.04) |
| 20 (comp) | Precision1® | Y | N | 0.21 (0.01) | 0.45 (0.02) | 0.52 (0.02) | 0.57 (0.04) |
| 21 (comp) | SiHy1 | Y | N | 0.20 (0.00) | 0.38 (0.02) | 0.43 (0.02) | 0.47 (0.02) |
| 22 (comp) | SiHy2 | Y | N | 0.20 (0.00) | 0.36 (0.01) | 0.40 (0.02) | 0.44 (0.03) |
| 23 (inv) | SiHy3 | Y | Y | 0.18 (0.03) | 0.34 (0.01) | 0.37 (0.01) | 0.40 (0.01) |
| 24 (comp) | SiHy4 | Y | N | 0.13 (0.00) | 0.23 (0.01) | 0.27 (0.03) | 0.31 (0.03) |

[1]MyDay®, Biofinity®, Clariti®, and Avaira Vitality™ are contact lenses manufactured by CooperVision; Dailies® AquaComfort Plus®, Proclear®, Air Optix® Aqua, Air Optix® Plus HydraGlyde®, Dailies Total 1®, and Precision1® are contact lenses manufactured by Alcon; BioTrue®, PureVision®, Infuse™, and Ultra® are contact lenses manufactured by Bausch & Lomb.

As can be seen from Table 6 and FIG. 12, SiHy2 (Example 23), which contains a HEV light absorbing compound and is representative of the invention, provides lower pervaporation rates than all other tested lenses except comparative lens SiHy4 (Example 24). Comparative SiHy4, however, includes a considerably greater amount of PVP (about 12 weight percent) in its RM than is present in the RM of inventive lens SiHy3 (about 7 weight percent). This discovery is illustrated in FIG. 15 in which the pervaporation rates of Examples 21-24 are plotted against the PVP content of the lenses (in the reactive mixtures), clearly showing the reduction in pervaporation rate in the lens having a HEV absorbing compound (SiHy3) over a similar formulation without such a HEV absorbing compound (SiHy1).

We claim:

1. A contact lens that is a free radical reaction product of a reactive mixture comprising:
   one or more monomers suitable for making the contact lens;
   a high energy visible (HEV) light absorbing compound; and
   a polyamide internal wetting agent in an amount of up to eleven weight percent,
   wherein the contact lens transmits from 0 percent to 70 percent of light having a wavelength range of 400 to 409 nm, and wherein the contact lens exhibits a pervaporation rate of less than 0.47 uL/min*cm$^2$ when measured at a relative humidity of about 0 percent.

2. The contact lens of claim 1 wherein the pervaporation rate is less than 0.45 uL/min*cm$^2$.

3. The contact lens of claim 1 wherein the pervaporation rate is less than 0.41 uL/min*cm$^2$.

4. The contact lens of claim 1 wherein the reactive mixture contains less than 9 weight percent of the polyamide internal wetting agent.

5. The contact lens of claim 1 that transmits from 0.2 percent to 70 percent of light having a wavelength range of 400 to 409 nm.

6. The contact lens of claim 1 that transmits from 1 percent to 70 percent of light having a wavelength range of 400 to 409 nm.

7. The contact lens of claim 1 that transmits 45 percent or less of light having a wavelength range of 280 to 399 nm.

8. The contact lens of claim 1 that transmits at least 80 percent of light having a wavelength range of 450 to 800 nm.

9. The contact lens of claim 1 that transmits: 45 percent or less of light having a wavelength range of 280 to 399 nm; from 1 percent to 70 percent of light having a wavelength range of 400 to 409 nm; and at least 80 percent of light having a wavelength range of 450 to 800 nm.

10. The contact lens of claim 9 that transmits: from 10 percent to 95 percent of light having a wavelength range of 410 to 424 nm; and at least 50 percent of light having a wavelength range of 425 to 449 nm.

11. The contact lens of claim 10 that transmits: 20 percent or less of light having a wavelength range of 280 to 399 nm; from 3 percent to 70 percent of light having a wavelength range of 400 to 409 nm; and at least 85 percent of light having a wavelength range of 450 to 800 nm.

12. The contact lens of claim 1 wherein the monomer suitable for making the ophthalmic device comprises a hydrophilic component, a silicone-containing component, or mixtures thereof.

13. A silicone hydrogel contact lens that is a reaction product of a reactive mixture comprising: a polymerizable high energy light absorbing compound; one or more monomers suitable for making the silicone hydrogel contact lens; and a polyamide internal wetting agent in an amount of up to eleven weight percent, wherein the silicone hydrogel contact lens has a contact angle of about 70° or less, a water content of at least 25 percent, and an oxygen permeability of at least 80 barrers, wherein the silicone hydrogel contact lens is substantially photostable, and wherein the silicone hydrogel contact lens exhibits a pervaporation rate of less than 0.47 uL/min*cm$^2$ when measured at a relative humidity of about 0 percent.

14. The silicone hydrogel contact lens of claim 13 wherein the pervaporation rate is less than about 0.45 uL/min*cm$^2$.

15. The silicone hydrogel contact lens of claim 13 wherein the pervaporation rate is less than 0.41 uL/min*cm$^2$.

16. The silicone hydrogel contact lens of claim 13 wherein the reactive mixture contains less than 9 weight percent of the polyamide internal wetting agent.

17. The silicone hydrogel contact lens of claim 13 wherein the lens transmits: from 0 percent to 70 percent of light having a wavelength of 400 to 409 nm; and at least 80 percent of light having a wavelength of 450 to 800 nm.

18. The silicone hydrogel contact lens of claim 13 wherein the lens transmits: from 0.2 percent to 70 percent of light having a wavelength of 400 to 409 nm; and at least 80 percent of light having a wavelength of 450 to 800 nm.

19. The silicone hydrogel contact lens of claim 13 wherein the lens transmits: from 1 percent to 70 percent of light having a wavelength of 400 to 409 nm; and at least 80 percent of light having a wavelength of 450 to 800 nm.

20. A method for improving a vision attribute in a contact lens wearer, the method comprising: providing the contact lens wearer with the contact lens of claim 1 or 13, wherein the vision attribute is selected from one or more of photostress recovery time, glare discomfort, glare disability threshold, heterochromatic contrast threshold, halo size, starburst size, and light scattering.

* * * * *